United States Patent
Hana et al.

(10) Patent No.: US 11,646,614 B2
(45) Date of Patent: May 9, 2023

(54) ROTOR OF ROTATING ELECTRICAL MACHINE AND REPAIRING METHOD THEREFOR

(71) Applicant: Mitsubishi Electric Corporation, Tokyo (JP)

(72) Inventors: Norihiko Hana, Tokyo (JP); Masao Akiyoshi, Tokyo (JP); Yosuke Uchida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 108 days.

(21) Appl. No.: 17/438,935

(22) PCT Filed: Jun. 5, 2019

(86) PCT No.: PCT/JP2019/022337
§ 371 (c)(1),
(2) Date: Sep. 14, 2021

(87) PCT Pub. No.: WO2020/245941
PCT Pub. Date: Dec. 10, 2020

(65) Prior Publication Data
US 2022/0158510 A1     May 19, 2022

(51) Int. Cl.
*H02K 1/26* (2006.01)
*H02K 15/00* (2006.01)
(Continued)

(52) U.S. Cl.
CPC ............... *H02K 1/26* (2013.01); *H02K 3/16* (2013.01); *H02K 3/34* (2013.01)

(58) Field of Classification Search
CPC .. H02K 1/26; H02K 3/16; H02K 3/34; H02K 15/0006; H02K 15/063; H02K 3/24; H02K 3/493; H02K 3/51
See application file for complete search history.

(56) References Cited

U.S. PATENT DOCUMENTS 4,922,147 A * 5/1990 Sismour, Jr. ............. H02K 3/24
310/61
9,991,755 B2 * 6/2018 Jang ....................... H02K 3/487
(Continued)

FOREIGN PATENT DOCUMENTS

JP    53-47454 U    4/1978
JP    54-142502 A    11/1979
(Continued)

OTHER PUBLICATIONS

International Search Report and Written Opinion dated Jul. 30, 2019, received for PCT Application PCT/JP2019/022337, Filed on Jun. 5, 2019, 10 pages including English Translation.

*Primary Examiner* — Naishadh N Desai
(74) *Attorney, Agent, or Firm* — Xsensus LLP

(57) ABSTRACT

In a rotor of a rotating electric machine, a slot includes a winding insertion portion and a widened portion. A width dimension of the widened portion is larger than a width dimension of the winding insertion portion. A pair of step portions are formed on both sides of an end portion of the winding insertion portion on the widened portion side. A wedge member is spaced from and opposed to the pair of step portions. An insulation includes: an insulation main body arranged between a rotor winding and a damper bar; and an extended portion, which is arranged in at least a part of a space between the wedge member and the pair of step portions, and is configured to suppress movement of the damper bar in a circumferential direction of a rotor core.

12 Claims, 28 Drawing Sheets

(51) Int. Cl.
    *H02K 3/16*          (2006.01)
    *H02K 3/34*          (2006.01)

(56) References Cited

U.S. PATENT DOCUMENTS

2010/0313909 A1* 12/2010 Calkins, Jr. .............. B08B 9/00
                                                                              15/97.1
2011/0012474 A1* 1/2011 Levit .................. H02K 15/0006
                                                                              310/179

FOREIGN PATENT DOCUMENTS

| JP | 58-204745 A | 11/1983 |
| --- | --- | --- |
| JP | 4-251552 A | 9/1992 |
| JP | 8-275426 A | 10/1996 |
| JP | 2001-86685 A | 3/2001 |
| JP | 2014-217098 A | 11/2014 |
| WO | 2019/220660 A1 | 11/2019 |

* cited by examiner

ROTOR OF ROTATING ELECTRICAL MACHINE AND REPAIRING METHOD THEREFOR

CROSS-REFERENCE TO RELATED APPLICATION

The present application is based on PCT filing PCT/JP2019/022337, filed Jun. 5, 2019, the entire contents of which are incorporated herein by reference.

TECHNICAL FIELD

This invention relates to a rotor of a rotating electric machine in which a rotor winding, an insulation, a damper bar, and a wedge member are inserted into a slot of a rotor core, and to a repairing method for the rotor.

BACKGROUND ART

In a related-art rotor of a rotating electric machine, a field winding is inserted into a slot formed in a rotor core. A damper bar, an insulation, and a wedge member are inserted into the slot in addition to the field winding.

An eddy current induced by a magnetic flux from an armature winding flows through the damper bar. The insulation electrically insulates the damper bar and the field winding from each other. The wedge member prevents scattering of slot contents (see, for example, Patent Literature 1).

CITATION LIST

Patent Literature

[PTL 1] JP 2001-86685 A

SUMMARY OF INVENTION

Technical Problem

In the related-art rotor as described above, the insulation, the damper bar, and the wedge member are arranged on a radially outer side of the rotor core with respect to the field winding. Thus, a distance between the field winding and the armature winding provided in an armature increases. With this, a part of a magnetic flux generated in the field winding is not interlinked with the armature winding, with the result that loss of the magnetic flux in the rotor core increases.

This invention has been made to solve the problem as described above, and has an object to obtain a rotor of a rotating electric machine, which is capable of reducing loss of a magnetic flux in a rotor core, and a repairing method for the rotor.

Solution to Problem

According to this invention, there is provided a rotor of a rotating electric machine, including: a rotor core including a slot formed therein; a rotor winding inserted into the slot; a damper bar, which has conductivity, and is inserted into the slot on a radially outer side of the rotor core with respect to the rotor winding; an insulation, which is arranged between the rotor winding and the damper bar, and is configured to electrically insulate the rotor winding and the damper bar from each other; and a wedge member, which is inserted into the slot on the radially outer side of the rotor core with respect to the damper bar, and is configured to hold the rotor winding, the insulation, and the damper bar inside the slot, wherein, when a cross section orthogonal to an axis of the rotor core is viewed, the slot includes: a winding insertion portion into which the rotor winding is inserted; and a widened portion in which an end portion of the wedge member on the damper bar side is arranged, wherein a width dimension of the widened portion is larger than a width dimension of the winding insertion portion, wherein a pair of step portions are formed on both sides of an end portion of the winding insertion portion on the widened portion side, wherein the wedge member is spaced from and opposed to the pair of step portions, and wherein the insulation includes: an insulation main body arranged between the rotor winding and the damper bar; and an extended portion, which is arranged in at least a part of a space between the wedge member and the pair of step portions, and is configured to suppress movement of the damper bar in a circumferential direction of the rotor core.

According to this invention, there is provided a repairing method for a rotor of a rotating electric machine, the rotor including: a rotor core including a slot formed therein; a rotor winding inserted into the slot; a damper bar, which has conductivity, and is inserted into the slot on a radially outer side of the rotor core with respect to the rotor winding; an existing insulation, which is arranged between the rotor winding and the damper bar, and is configured to electrically insulate the rotor winding and the damper bar from each other; and an existing wedge member, which is inserted into the slot on the radially outer side of the rotor core with respect to the damper bar, and is configured to hold the rotor winding, the existing insulation, and the damper bar inside the slot, the repairing method including a step of replacing the existing wedge member with a thin wedge member and replacing the existing insulation with a new insulation to increase a total sectional area of the rotor winding in the slot, wherein the new insulation includes: an insulation main body arranged between the rotor winding and the damper bar; and an extended portion, which is arranged in a space defined inside the slot as a result of replacement of the existing wedge member with the thin wedge member, and is configured to suppress movement of the damper bar in a circumferential direction of the rotor core.

Advantageous Effects of Invention

According to this invention, it is possible to reduce loss of the magnetic flux in the rotor core.

DESCRIPTION OF EMBODIMENTS

Now, modes for carrying out this invention are described with reference to the drawings.

First Embodiment

Figure 1:
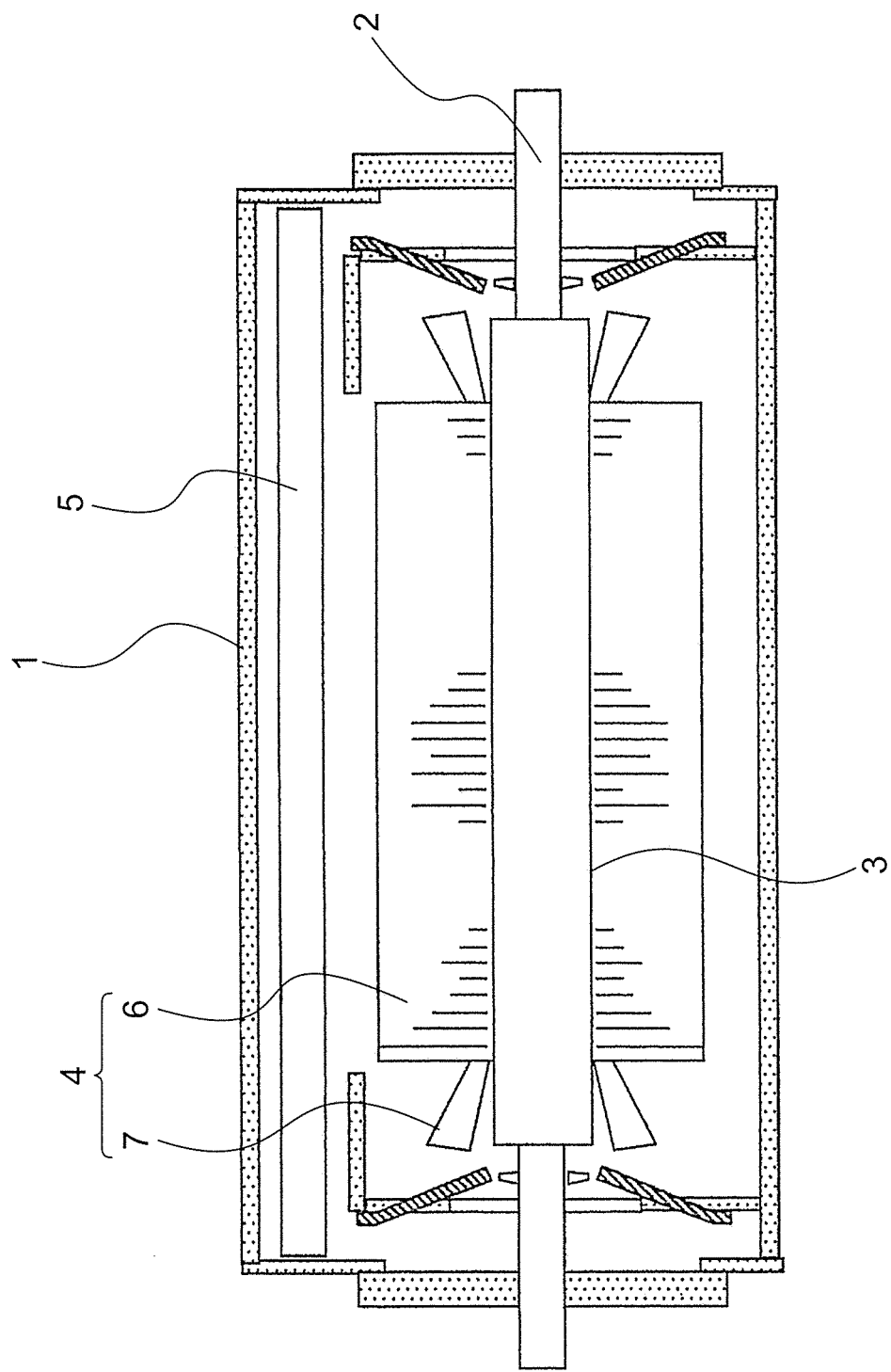
FIG. 1 is a longitudinal sectional view of a rotating electric machine according to a first embodiment of this invention.

FIG. 1 is a longitudinal sectional view of a rotating electric machine according to a first embodiment of this invention, and is an illustration of a cross section taken along an axial center of a rotation shaft. In FIG. 1, the rotating electric machine includes a frame 1, a rotation shaft 2, a rotor 3, an armature 4 being a stator, and a gas cooler 5.

The rotation shaft 2 is rotatably supported on the frame 1. Further, the rotation shaft 2 is connected to a turbine (not shown). The turbine applies a rotational force to the rotation shaft 2. The rotor 3 is fixed to the rotation shaft 2, and rotates about the rotation shaft 2 integrally with the rotation shaft 2.

The armature 4 is held on the frame 1. Further, the armature 4 includes an armature core 6 and an armature winding 7 being a stator winding. The armature core 6 surrounds the rotor 3 via a gap from the rotor 3. In FIG. 1, the gap is omitted. Further, the armature core 6 is arranged coaxially with the rotor 3.

The armature winding 7 is held on the armature core 6. The rotor 3 is rotated to apply a rotating magnetic field to the armature winding 7. With this, an electromotive force is generated in the armature winding 7. That is, a magnetic flux from the rotor 3 is interlinked with the armature winding 7 to generate an output current. The rotating electric machine in the first embodiment operates as a generator.

Refrigerant for suppressing heat generation of the rotor 3 and the armature 4 is contained inside the frame 1. As the refrigerant, air or hydrogen is used. The gas cooler 5 is provided inside the frame 1, and is configured to cool the refrigerant inside the frame 1.

Figure 2:
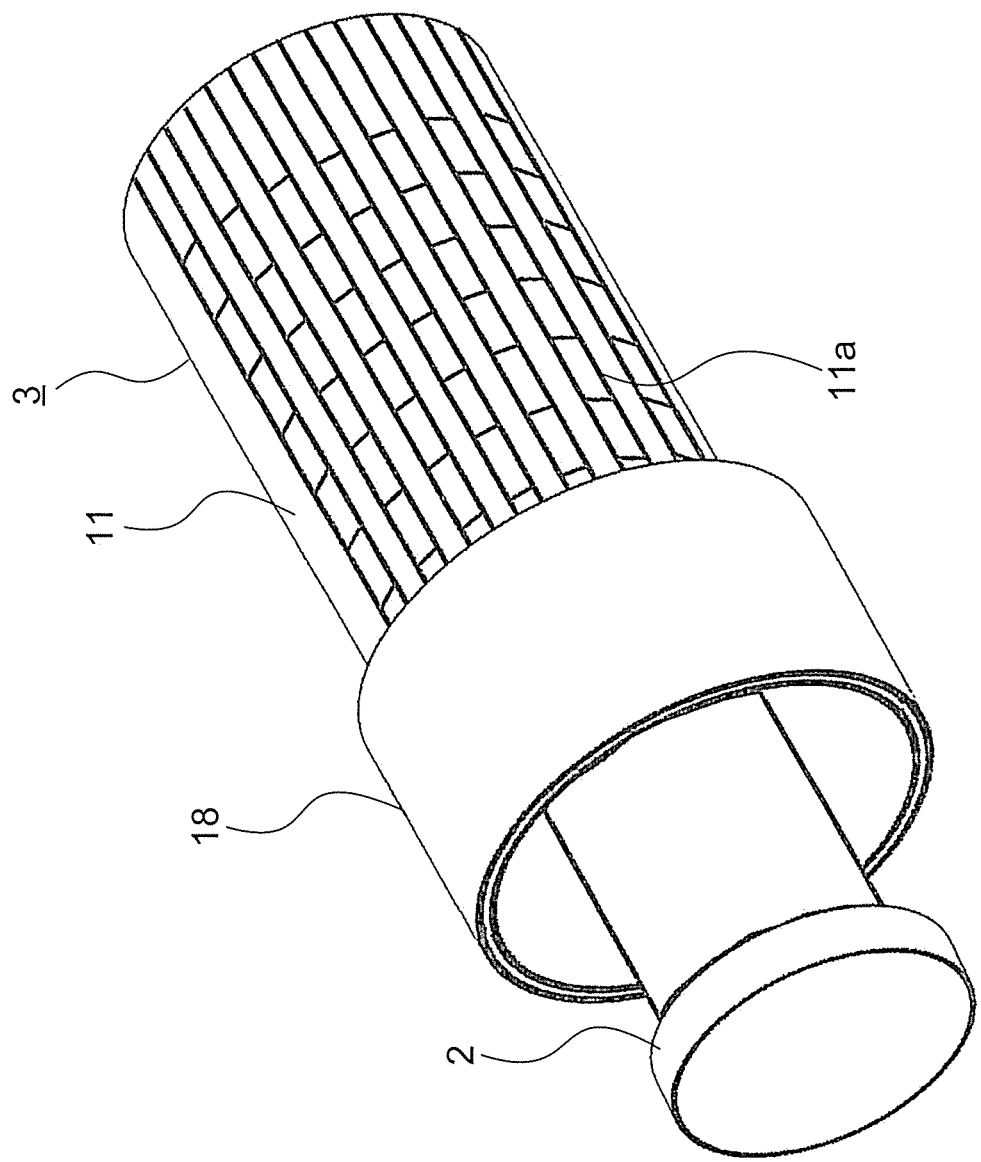
FIG. 2 is a perspective view for illustrating a main part of a rotor of FIG. 1.
Figure 3:
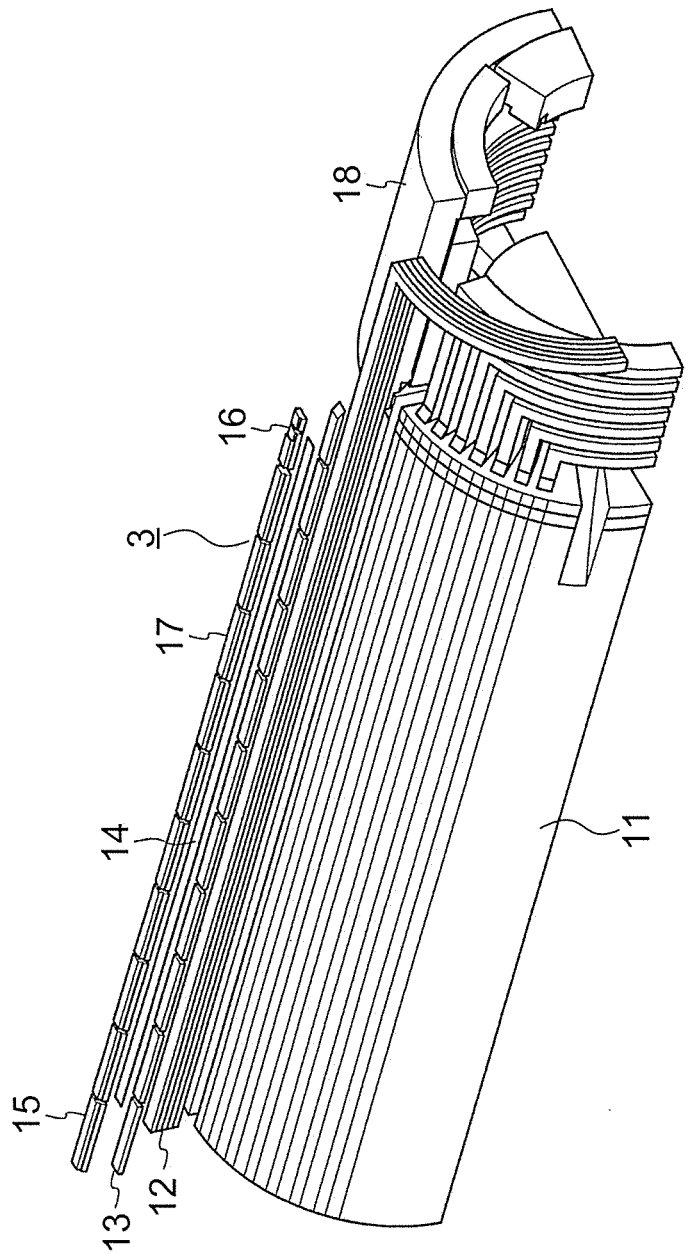
FIG. 3 is an exploded perspective view of the main part of the rotor of FIG. 1 as viewed in a direction different from that of FIG. 2.

FIG. 2 is a perspective view for illustrating a main part of the rotor 3 of FIG. 1. Further, FIG. 3 is an exploded perspective view of the main part of the rotor 3 of FIG. 1 as viewed in a direction different from that of FIG. 2. The rotor 3 includes a cylindrical rotor core 11, a plurality of field windings 12 being rotor windings, a plurality of insulations 13, a plurality of damper bars 14, a plurality of first wedge members 15, a plurality of second wedge members 16, a plurality of third wedge members 17, and a pair of holding rings 18.

The rotor core 11 is fixed to the rotation shaft 2. The rotation shaft 2 passes through the rotor core 11. The rotor core 11 includes a plurality of straight slots 11a formed in an outer peripheral portion thereof. The plurality of slots 11a are arranged at intervals in a circumferential direction of the rotor core 11. The circumferential direction of the rotor core 11 is a rotation direction of the rotor core 11.

Further, each slot 11a is continuously formed over the entire length of the rotor core 11 along an axial direction of the rotor core 11. The axial direction of the rotor core 11 is a direction parallel to the axial center of the rotation shaft 2. Further, each slot 11a is opened at an outer peripheral surface of the rotor core 11.

The plurality of field windings 12, the plurality of insulations 13, the plurality of damper bars 14, the plurality of first wedge members 15, the plurality of second wedge members 16, and the plurality of third wedge members 17 are inserted into corresponding slots 11a, respectively.

The plurality of first wedge members 15 are each arranged at the center of the rotor core 11 in the axial direction. The plurality of second wedge members 16 are arranged at both end portions of the rotor core 11 in the axial direction. The plurality of third wedge members 17 are each arranged between the first wedge member 15 and the second wedge member 16.

The plurality of first wedge members 15, the plurality of second wedge members 16, and the plurality of third wedge members 17 prevent protrusion of contents inserted into the corresponding slots 11a due to a centrifugal force. That is, the wedge members 15, 16, and 17 hold the field winding 12, the insulation 13, and the damper bar 14 inside the slot 11a.

Coupling structures (not shown) are provided at both end portions of the rotor core 11 in the axial direction, respectively. Each coupling structure couples the plurality of field windings 12 to each other. The pair of holding rings 18 are provided at both end portions of the rotor core 11 in the axial direction. Each holding ring 18 suppresses deformation of the corresponding coupling structure due to a centrifugal force. Further, each holding ring 18 is made of a material having conductivity.

Figure 4:
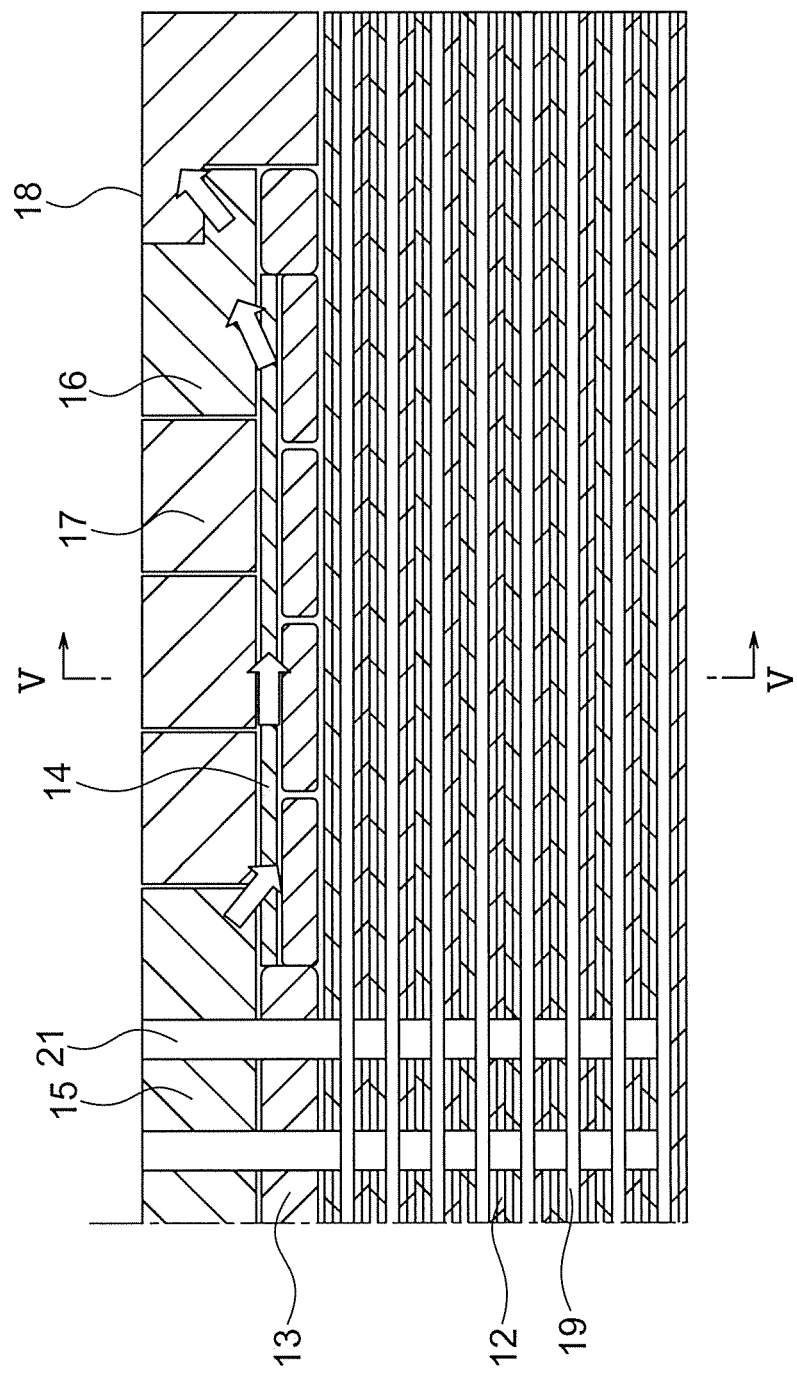
FIG. 4 is a longitudinal sectional view for illustrating a first example of a structure inside a slot of the rotor according to the first embodiment before repair.
Figure 5:
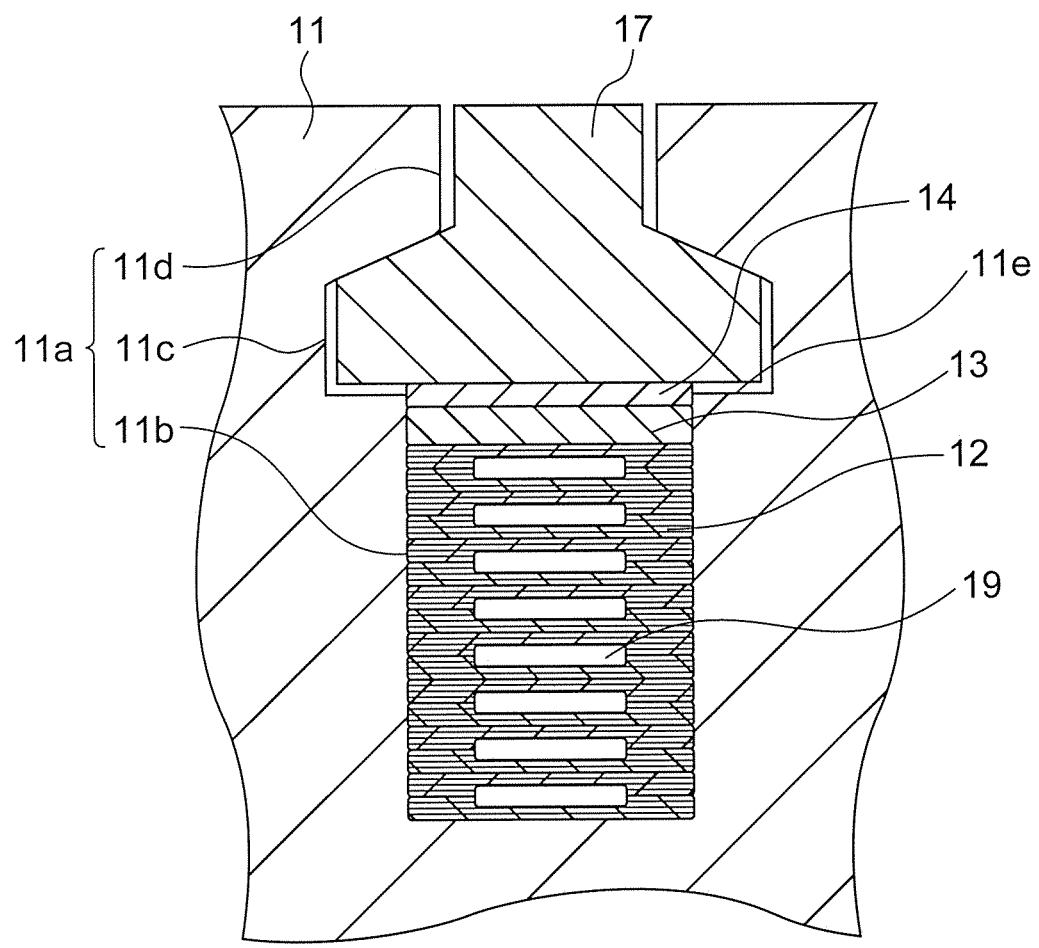
FIG. 5 is a transverse sectional view taken along the line V-V of FIG. 4.

FIG. 4 is a longitudinal sectional view for illustrating a first example of a structure inside the slot 11a of the rotor 3 according to the first embodiment before repair, and a left end of FIG. 4 is the center of the rotor 3 in the axial direction. FIG. 5 is a transverse sectional view taken along the line V-V of FIG. 4, and is an illustration of a cross section orthogonal to the axial center of the rotation shaft 2.

When a cross section orthogonal to the axis of the rotor core 11 is viewed, the slot 11a includes a winding insertion portion 11b, a widened portion 11c, and an opening portion 11d. The winding insertion portion 11b, the widened portion 11c, and the opening portion 11d are arranged continuously from a radially inner side to a radially outer side of the rotor core 11. A radial direction of the rotor core 11 is a direction orthogonal to the axis of the rotor core 11.

A width dimension of the widened portion 11c is larger than a width dimension of the winding insertion portion 11b and a width dimension of the opening portion 11d. With this, a pair of step portions lie are formed on both sides of the winding insertion portion 11b on the widened portion 11c side.

The corresponding field winding 12, the plurality of corresponding insulations 13, and the plurality of corresponding damper bars 14 are inserted into the winding insertion portion 11b.

The corresponding first wedge member 15, the pair of corresponding second wedge members 16, and the plurality of corresponding third wedge members 17 are inserted into the widened portion 11c and the opening portion 11d. End portions of each of the wedge members 15, 16, and 17 on the damper bar 14 side are arranged in the widened portion 11c. End portions of each of the wedge members 15, 16, and 17 on a side opposite to the damper bar 14 are arranged in the opening portion 11d.

The damper bars 14 are inserted into the slot 11a on the radially outer side of the rotor core 11 with respect to the field winding 12. The insulations 13 are arranged between the field winding 12 and the damper bars 14. Further, the insulations 13 electrically insulate the field winding 12 and the damper bars 14 from each other.

The wedge members 15, 16, and 17 are inserted into the slot 11a on the radially outer side of the rotor core 11 with respect to the damper bars 14.

Each damper bar 14 is made of a material having conductivity. The damper bar 14 is not arranged at a center portion of the rotor core 11 in the axial direction.

The first wedge member 15 is in contact with the pair of damper bars 14 arranged away from each other in the axial direction of the rotor core 11, and electrically short-circuits between the pair of damper bars 14. The second wedge member 16 is in contact with the damper bar 14 and the holding ring 18, and electrically short-circuits the damper bar 14 and the holding ring 18 to each other.

With this, an eddy current flowing through the damper bar 14 arranged on the other side in the axial direction is induced by a magnetic flux from the armature winding 7 and passes through the first wedge member 15 to flow to the damper bar 14 arranged on one side in the axial direction as indicated by the arrows of FIG. 4. Further, the eddy current flowing through the damper bar 14 passes through the second wedge member 16 to flow to the holding ring 18.

The eddy current having flowed to the holding ring 18 passes from the holding ring 18 through the second wedge member 16 arranged inside another slot 11a to flow to the damper bar 14. With this, a passage for the eddy current via the holding ring 18 is formed inside the rotor core 11, thereby suppressing heat generation of the rotor 3 including the first wedge members 15 and the second wedge members 16, which is caused by the eddy current.

As described above, the first wedge member 15 and the second wedge member 16 are required to have high conductivity. Thus, the first wedge member 15 and the second wedge member 16 are made of metal having high conductivity such as a BeCu alloy.

The conductivity required for the first wedge member 15 and the second wedge member 16 is 20% IACS according to the International Annealed Copper Standard (IACS), which is a standard of conductivity.

In contrast, the third wedge member 17 is not required to have conductivity. Thus, the third wedge member 17 is made of a non-magnetic material having high strength such as stainless steel.

The material strength required for the third wedge member 17 is defined by 0.2% proof stress, and is 196 MPa or more. With this, the third wedge member 17 is suppressed from generating heat by the magnetic flux from the armature winding 7.

A plurality of axial ventilation passages 19 are provided along the axial direction of the rotor core 11 inside the field winding 12. Further, the plurality of axial ventilation passages 19 are arranged at intervals in the radial direction of the rotor core 11.

A plurality of radial ventilation passages 21 are provided along the radial direction of the rotor core 11 inside the slot 11a. The plurality of radial ventilation passages 21 are arranged at intervals in the axial direction of the rotor core 11. Further, each radial ventilation passage 21 penetrates the corresponding first wedge member 15, the corresponding insulation 13, and the plurality of corresponding field windings 12, and connects the plurality of axial ventilation passages 19 and an outside of the rotor 3 to each other.

The ventilation type of the rotor 3 in the first example is an axial ventilation type in which the number of axial ventilation passages 19 is larger than the number of radial ventilation passages 21.

Figure 6:
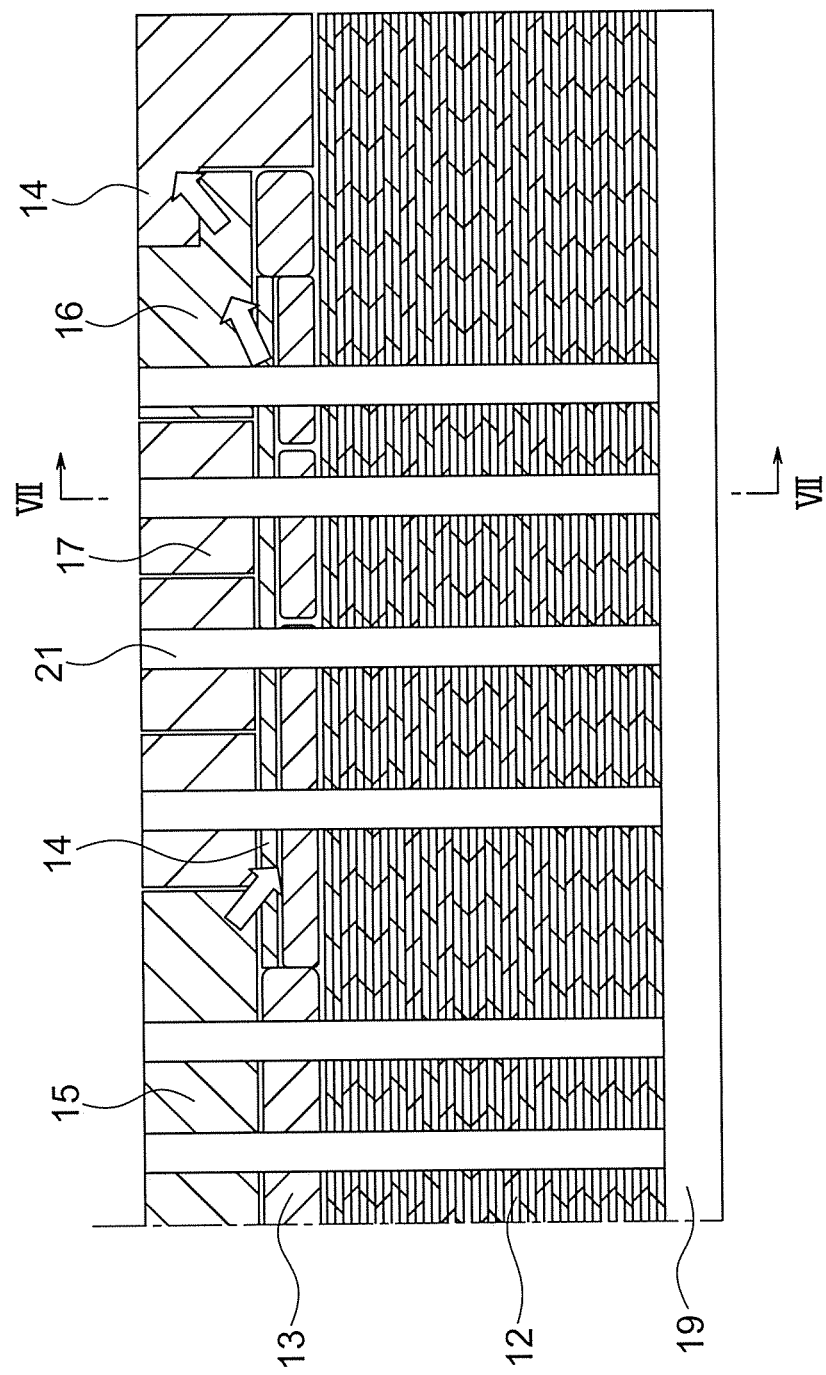
FIG. 6 is a longitudinal sectional view for illustrating a second example of a structure inside the slot of the rotor according to the first embodiment before repair.
Figure 7:
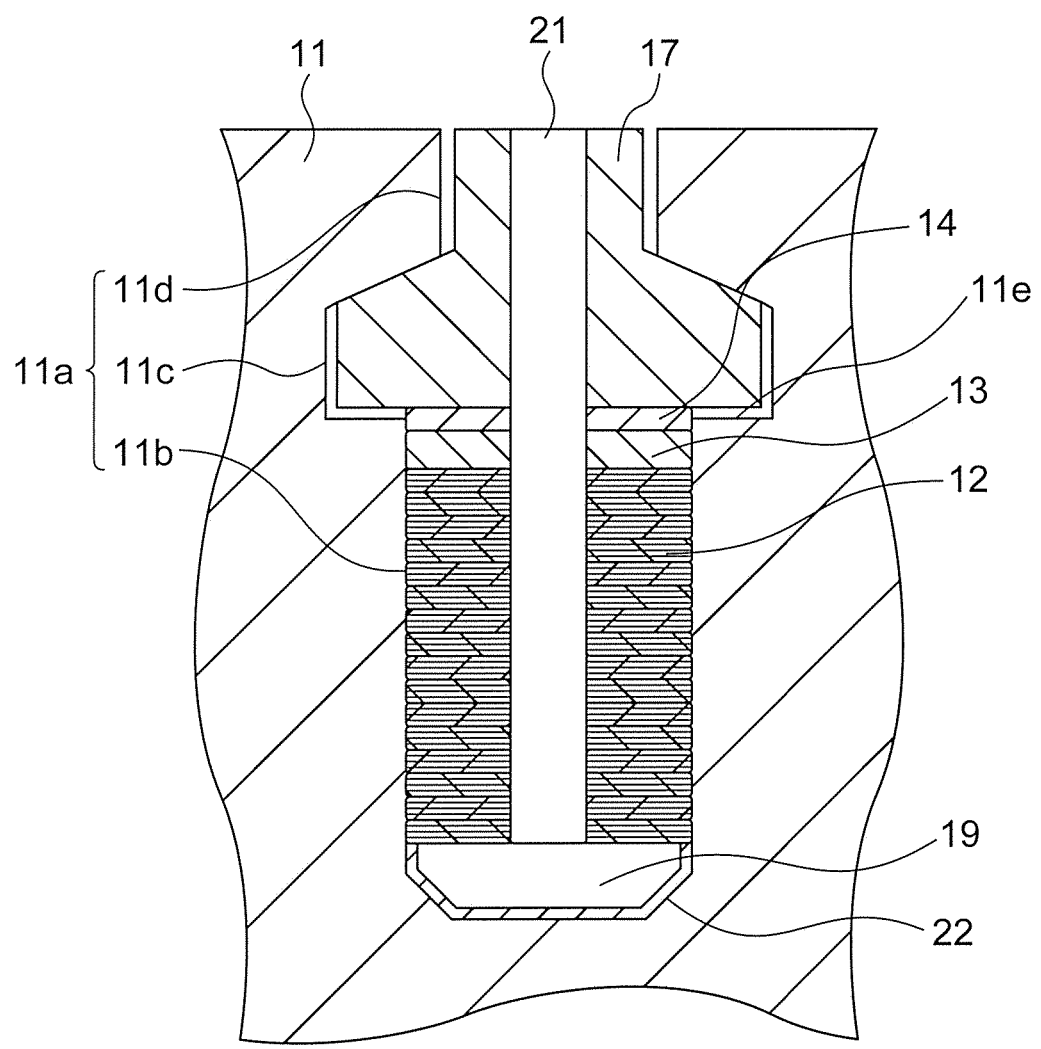
FIG. 7 is a transverse sectional view taken along the line VII-VII of FIG. 6.

FIG. 6 is a longitudinal sectional view for illustrating a second example of a structure inside the slot 11a of the rotor 3 according to the first embodiment before repair. Further, FIG. 7 is a transverse sectional view taken along the line VII-VII of FIG. 6. In the second example, the axial ventilation passage 19 is provided only at a bottom portion of the slot 11a. The axial ventilation passage 19 is formed by a channel member 22 having a U-shaped cross section.

The radial ventilation passages 21 are arranged also at the positions of the second wedge members 16 and the positions of the third wedge members 17 in the axial direction of the rotor core 11. Other configurations are the same as those of the first example.

The ventilation type of the rotor 3 in the second example is a radial ventilation type in which the number of radial ventilation passages 21 is larger than the number of axial ventilation passages 19.

The rotor 3 according to the first embodiment can be applied to both the radial ventilation type and the axial ventilation type. In the following, a case of applying to the axial ventilation type is described. The rotor 3 according to other embodiments can also be applied to both the radial ventilation type and the axial ventilation type.

Figure 8:
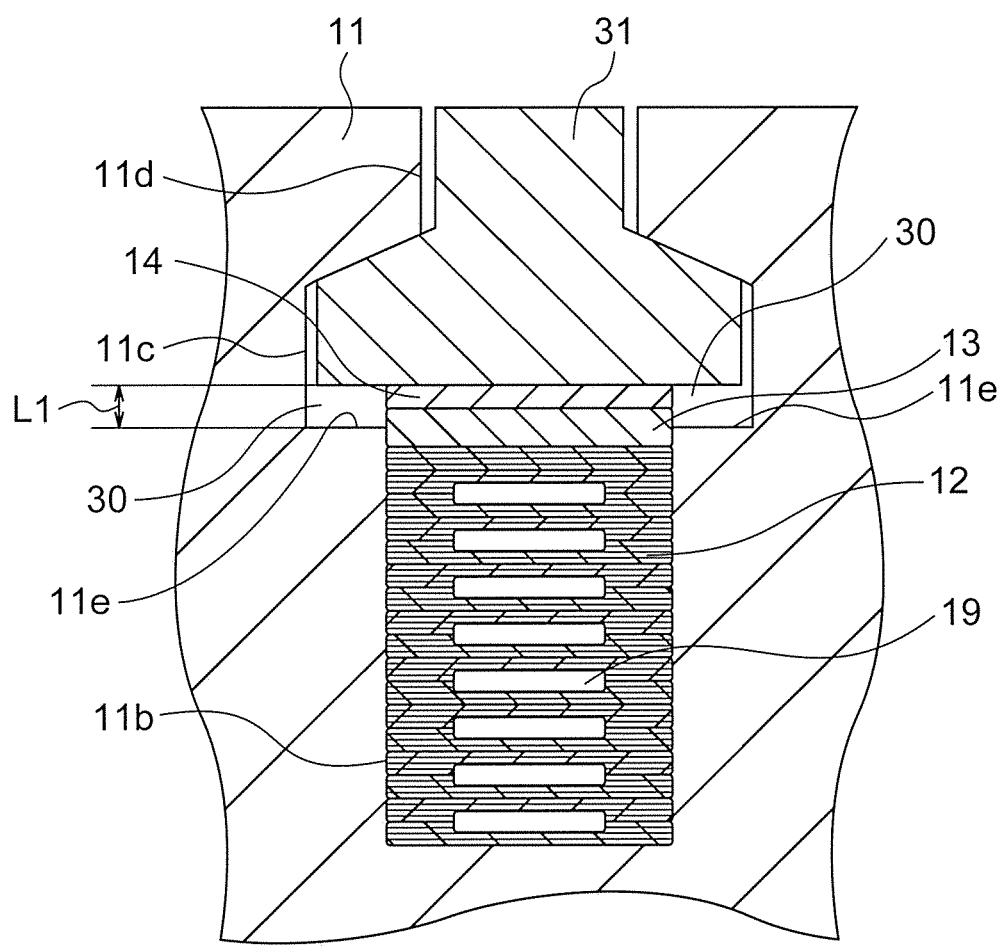
FIG. 8 is a transverse sectional view for illustrating a state in which a third wedge member of FIG. 5 is replaced with a thin third wedge member.

FIG. 8 is a transverse sectional view for illustrating a state in which the third wedge member 17 of FIG. 5 is replaced with a thin third wedge member 31. In FIG. 8, the thin third wedge member 31 is used so that the damper bar 14 is arranged in the widened portion 11c. Further, a pair of spaces 30 are defined between the pair of step portions 11e and the third wedge member 31.

In such a configuration, the spaces 30 are present on both sides of the damper bar 14. Thus, there is a fear in that the damper bar 14 is moved in the circumferential direction of the rotor core 11 when the rotating electric machine is started or stopped. When the damper bar 14 is moved, a centrifugal force of the field winding 12 is transmitted nonuniformly to the third wedge member 31 via the damper bar 14.

Thus, there is a fear in that local heating and discharging occur between the damper bar 14 and the third wedge member 31. Further, there is a fear in that, when the damper bar 14 is repeatedly deformed, the damper bar 14 is broken.

Figure 9:
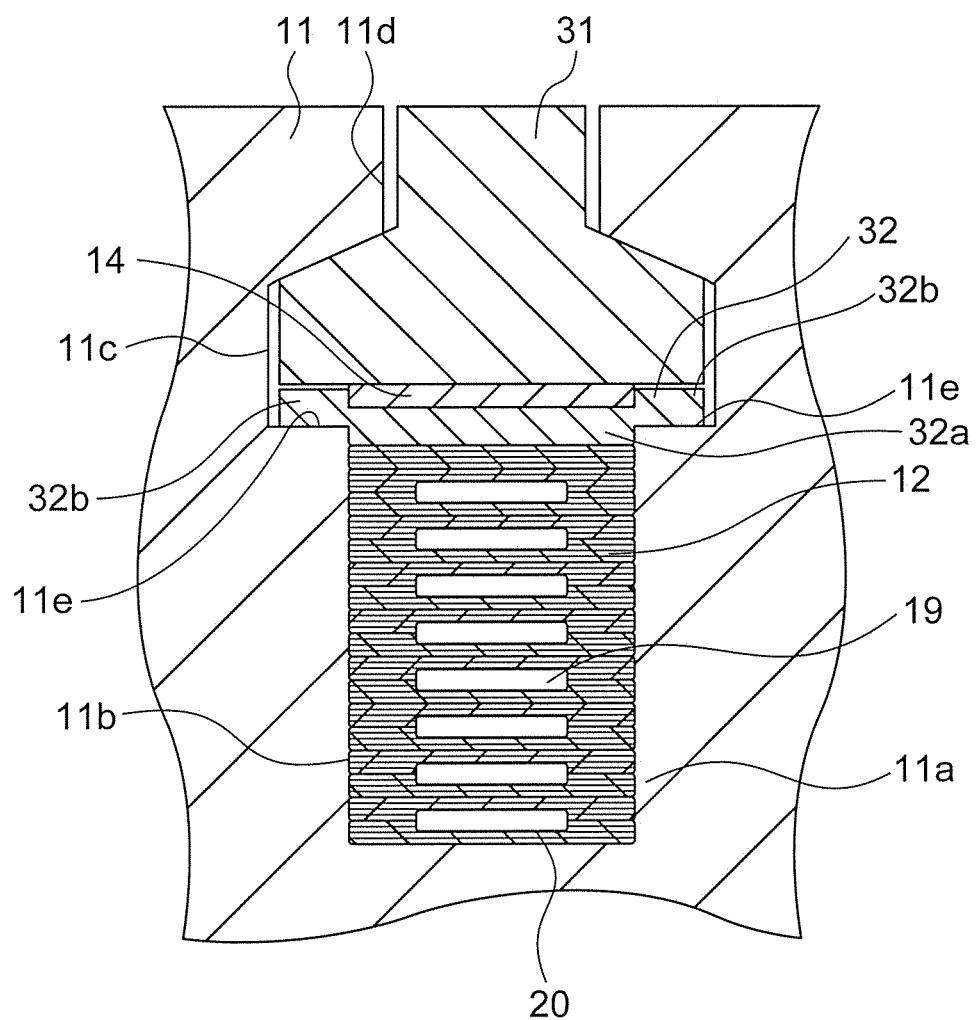
FIG. 9 is a transverse sectional view for illustrating a structure inside the slot of the rotor according to the first embodiment after repair.
Figure 10:
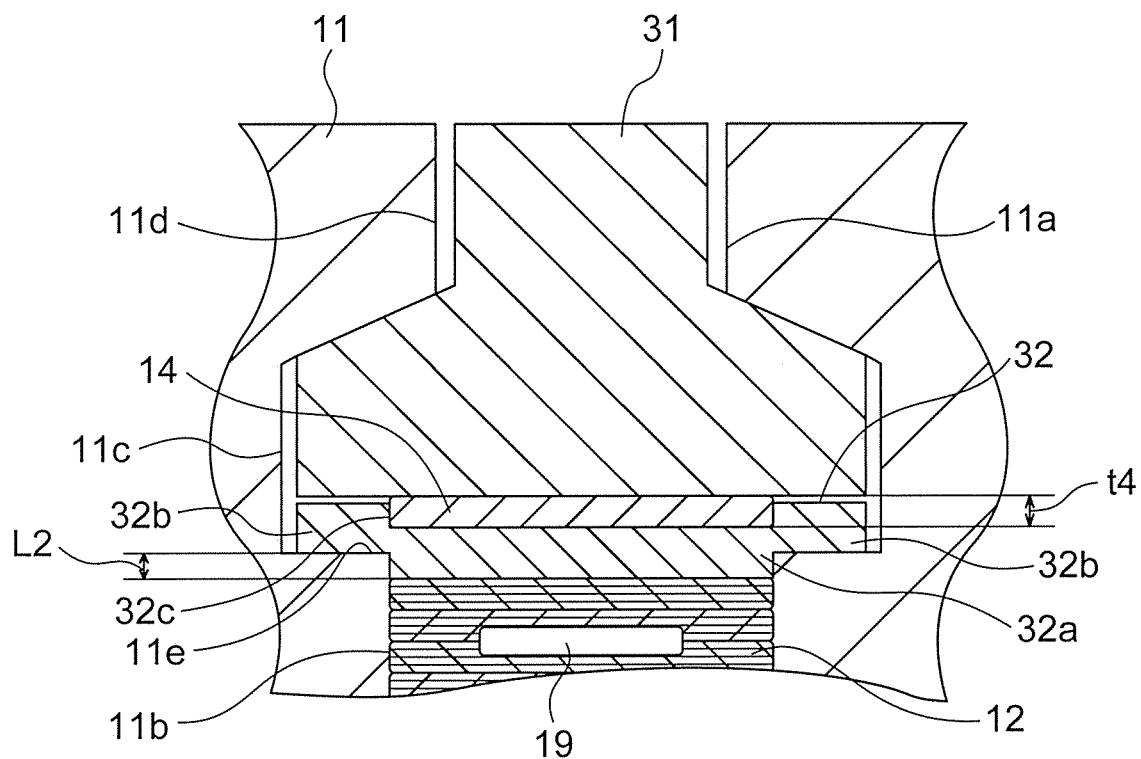
FIG. 10 is a transverse sectional view for illustrating a main part of FIG. 9 in an enlarged manner.

FIG. 9 is a transverse sectional view for illustrating a structure inside the slot 11a of the rotor 3 according to the first embodiment after repair. FIG. 10 is a transverse sectional view for illustrating a main part of FIG. 9 in an enlarged manner.

In the first embodiment, the third wedge member 17 of FIG. 5 is replaced with the thin third wedge member 31. Although not illustrated, the first wedge member 15 and the second wedge member 16 are replaced with thin first and second wedge members, respectively. The sectional shapes of the thin first and second wedge members are the same as that of the third wedge member 31.

Further, the insulation 13 of FIG. 5 is replaced with an insulation 32. Further, a total sectional area of the field winding 12 in the winding insertion portion 11b is increased.

The insulation 32 in the first embodiment includes an insulation main body 32a and a pair of extended portions 32b. The insulation main body 32a is arranged between the field winding 12 and the damper bar 14. Further, the insulation main body 32a is in contact with the field winding 12 and the damper bar 14. Further, the insulation main body 32a is arranged across the winding insertion portion lib and the widened portion 11c.

The pair of extended portions 32b are arranged in the pair of spaces 30 in FIG. 8, respectively. That is, the pair of extended portions 32b are arranged between the third wedge member 31 and the pair of step portions 11e, respectively.

Further, the pair of extended portions 32b are arranged on both sides in a width direction of the damper bar 14 to suppress movement of the damper bar 14 in the circumferential direction of the rotor core 11. The width direction of the damper bar 14 is a right-and-left direction of FIG. 9.

Figure 11:
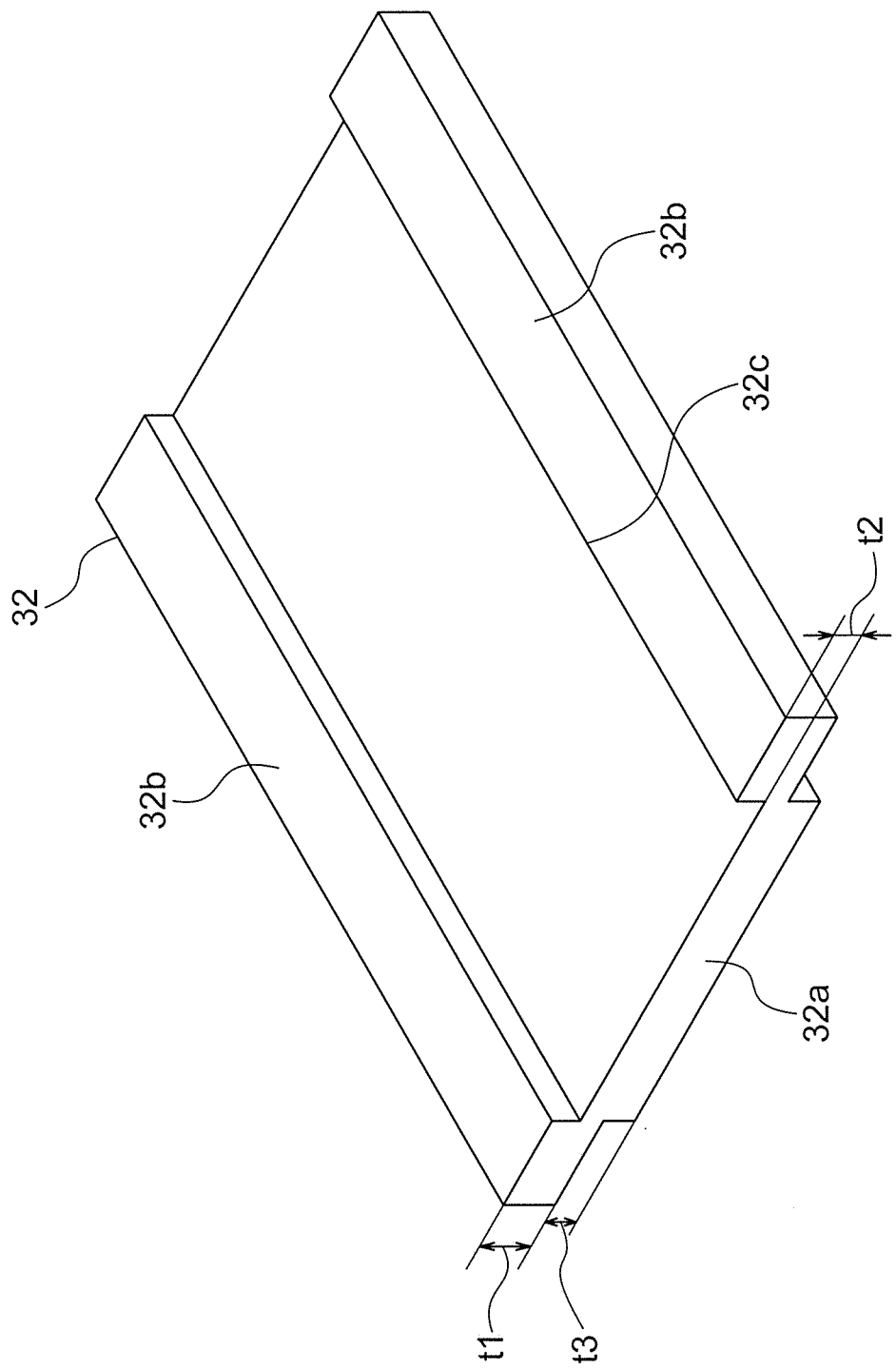
FIG. 11 is a perspective view for illustrating an insulation of FIG. 10.

FIG. 11 is a perspective view for illustrating the insulation 32 of FIG. 10. The insulation main body 32a and the pair of extended portions 32b are formed as an integrated body, that is, one component. A bar receiving groove 32c is formed between the pair of extended portions 32b along the axial direction of the rotor core 11. The damper bar 14 is received in the bar receiving groove 32c. Thus, a width dimension of the bar receiving groove 32c is slightly larger than a width dimension of the damper bar 14.

As the material of the insulation 32, a composite material having an electrical insulating property and high rigidity and strength such as glass fiber-reinforced plastic, paper phenol plastic, or aramid fiber-reinforced plastic is used.

When carbon fiber-reinforced plastic is used as the material of the insulation 32, carbon having high conductivity is contained in abrasion powder, and hence it is preferred that an outer periphery of the insulation 32 be covered with a covering member. As the material of the covering member, for example, plastic or glass fiber-reinforced plastic that does not generate a conductive substance even when the glass fiber-reinforced plastic is worn off can be used.

Dimensions of the portions of the insulation 32 in the radial direction of the rotor core 11 are required to satisfy the following conditions 1 to 4.

Condition 1: Distance L1 Between the Step Portions 11e and Third Wedge Member 31 Illustrated in FIG. 8>Thickness Dimension t1 of Extended Portion 32B Illustrated in FIG. 11

Condition 2: Thickness Dimension t4 of Damper Bar 14 Illustrated in FIG. 10>Thickness Dimension t2 Illustrated in FIG. 11

The thickness dimension t2 is a thickness dimension of a portion of the extended portion 32b which is located on the radially outer side of the rotor core 11 with respect to the insulation main body 32a, and is equal to a depth of the bar receiving groove 32c.

Condition 3: (Distance L1 Illustrated in FIG. 8—Thickness Dimension t1 of Extended Portion 32b Illustrated in FIG. 11)<Thickness Dimension t4 of Damper bar 14 Illustrated in FIG. 10

Condition 4: Distance L2 Illustrated in FIG. 10<Thickness Dimension t3 Illustrated in FIG. 11

The distance L2 is a distance from a boundary between the winding insertion portion 11b and the widened portion 11c to the field winding 12. Further, the thickness dimension t3 is a thickness dimension of a portion of the insulation main body 32a which is located on the radially inner side of the rotor core 11 with respect to the extended portions 32b.

The condition 1 is a condition for preventing direct contact of the insulation 32 with the third wedge member 31. Further, the condition 2 is a condition for the damper bar 14 to come into contact with the third wedge member 31 ahead of the insulation 32.

With those conditions 1 and 2, a pressing force generated when the third wedge member 31 is assembled to the rotor core 11 is transmitted to the field winding 12 via the damper bar 14 and the insulation main body 32a.

The condition 3 is a condition required to prevent movement of the damper bar 14 in the circumferential direction of the rotor core 11 due to the insulation 32. Further, the condition 3 indicates that a gap defined between the third wedge member 31 and the extended portion 32b is smaller than the thickness dimension of the damper bar 14.

The condition 4 is a condition for transmitting all loads to the field winding 12 without sharing the loads between the insulation 32 and the step portions 11e when the damper bar 14 receives the pressing force by the third wedge member 31.

When the above-mentioned conditions 1 to 4 are satisfied, the field winding 12 can be held by the third wedge member 31 without changing management of a force managed when the third wedge member 31 is to be assembled to the rotor core 11.

As described above, in the repairing method for the rotor 3 according to the first embodiment, the plurality of existing first wedge members 15, the plurality of existing second wedge members 16, and the plurality of existing third wedge members 17 are replaced with the plurality of thin first wedge members, the plurality of thin second wedge members, and the plurality of thin third wedge members 31, respectively.

Further, in the repairing method for the rotor 3 according to the first embodiment, the plurality of existing insulations 13 are replaced with the new insulations 32, respectively.

The pair of extended portions 32b of the new insulation 32 are arranged in the pair of spaces 30 defined inside the slot 11a as a result of replacement of the wedge members.

Further, in the repairing method for the rotor 3 according to the first embodiment, the total sectional area of the field winding 12 in the slot 11a is increased.

In the rotor 3 of a rotating electric machine and the repairing method for the rotor 3 as described above, the thin first wedge members, the thin second wedge members, and the thin third wedge members 31 are used. With this, the distance from the field winding 12 to the armature winding 7 can be shortened, thereby being capable of reducing loss of the magnetic flux in the rotor core 11.

Further, movement of the damper bar 14 in the circumferential direction of the rotor core 11 is suppressed by the pair of extended portions 32b. Thus, occurrence of local heating and discharging between the first wedge member, the second wedge member, and the third wedge member 31 and the damper bar 14 is suppressed. Further, breakage of the damper bar 14 can be suppressed. With this, the reliability of the rotating electric machine can be improved.

Further, the material used for the insulation 32 is lighter than the materials used for the damper bar 14, the first wedge member, the second wedge member, and the third wedge member 31. Thus, even when the pair of extended portions 32b are added to the insulation main body 32a, an increase in a centrifugal force to be applied to the first wedge member, the second wedge member, and the third wedge member 31 is small.

Further, when the insulation 32 is used, repair work for thinning the wedge members can be performed on a generator which has already been operated at a power plant.

Second Embodiment

Figure 12:
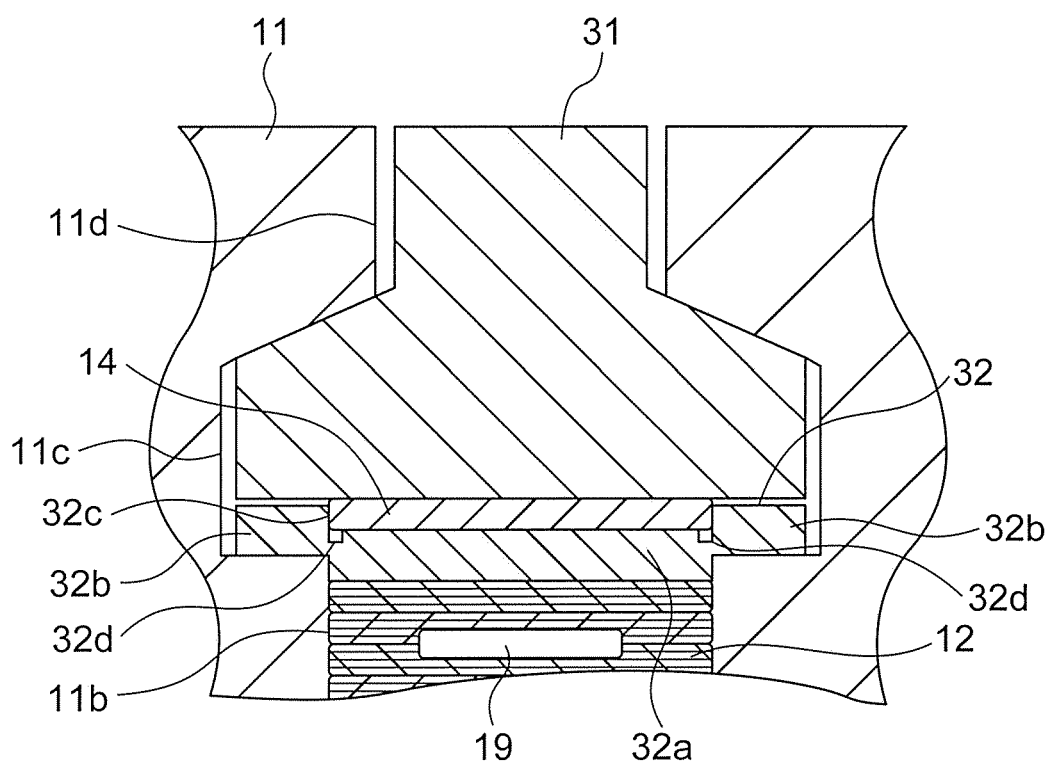
FIG. 12 is a transverse sectional view for illustrating a main part of a rotor of a rotating electric machine according to a second embodiment of this invention.
Figure 13:
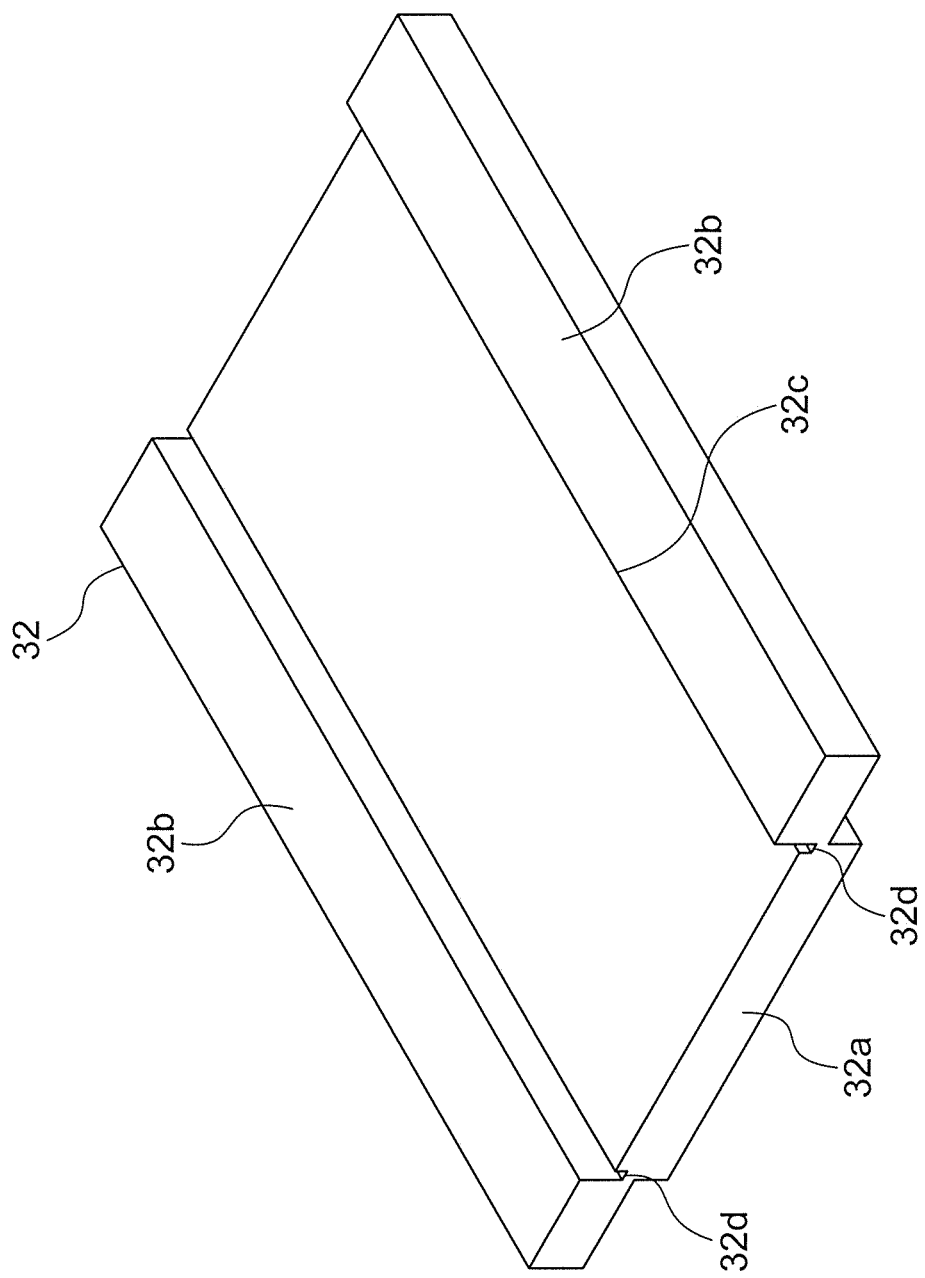
FIG. 13 is a perspective view for illustrating an insulation of FIG. 12.

Next, FIG. 12 is a transverse sectional view for illustrating a main part of a rotor of a rotating electric machine according to a second embodiment of this invention. Further, FIG. 13 is a perspective view for illustrating the insulation 32 of FIG. 12.

A pair of relief grooves 32d are formed in a surface of the insulation main body 32a which is opposed to the third wedge member 31. The pair of relief grooves 32d are formed at boundary portions between the insulation main body 32a and the pair of extended portions 32b, respectively. With this, as compared to the first embodiment, the contact area between the insulation 32 and the damper bar 14 is smaller.

The pair of relief grooves 32d are continuously formed over the entire length of the insulation 32 along the axial direction of the rotor core 11. Other configurations and a repairing method are similar or identical to those of the first embodiment.

In order to adjust a force to be applied when the first wedge member, the second wedge member, or the third wedge member 31 is to be assembled to the rotor core 11, the thickness of the insulation main body 32a in the radial direction of the rotor core 11 is adjusted in some cases. When the thickness of the insulation main body 32a is to be adjusted, the surface of the insulation main body 32a which is in contact with the damper bar 14, that is, a bottom surface of the bar receiving groove 32c is cut.

In the second embodiment, when the insulation main body 32a is to be cut, a tool can be released to the pair of relief grooves 32d, thereby being capable of uniformly cutting the entire surface to be in contact with the damper bar 14. Thus, the thickness of the insulation main body 32a can be easily adjusted.

Third Embodiment

Figure 14:
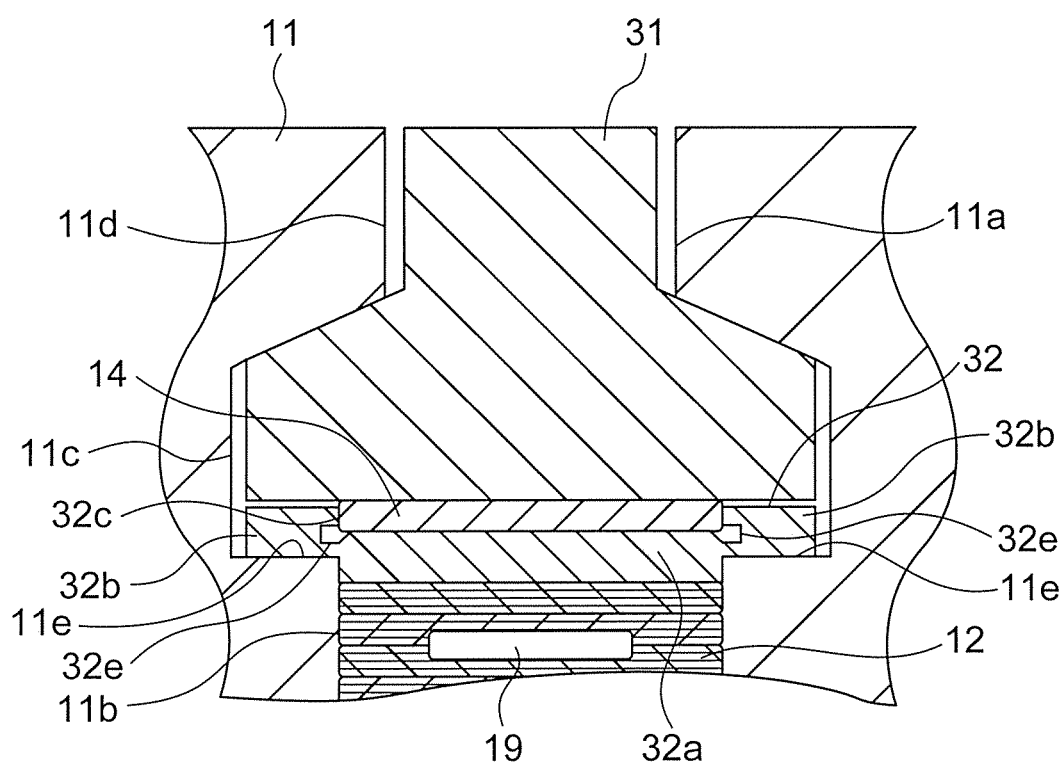
FIG. 14 is a transverse sectional view for illustrating a main part of a rotor of a rotating electric machine according to a third embodiment of this invention.
Figure 15:
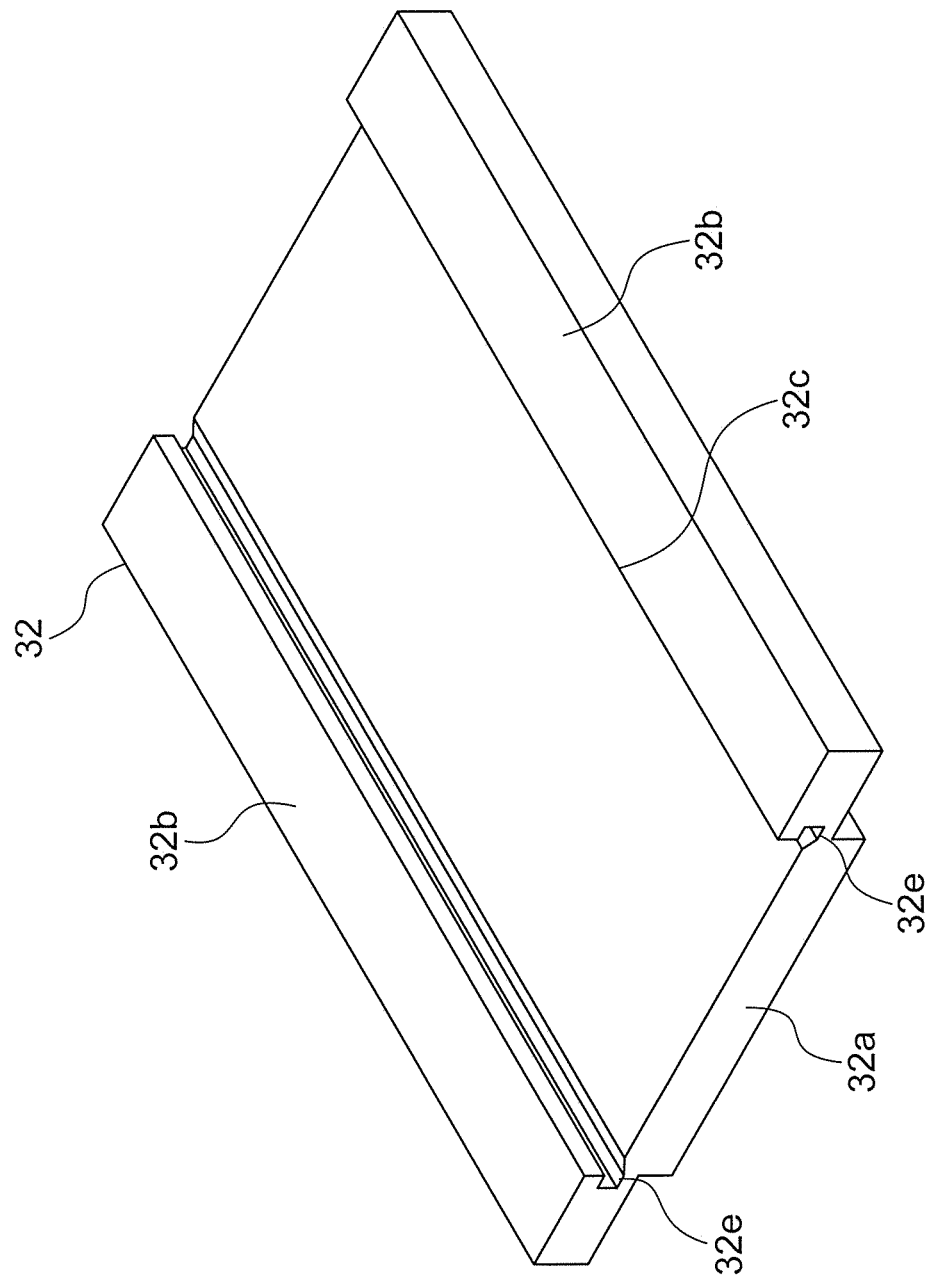
FIG. 15 is a perspective view for illustrating an insulation of FIG. 14.

Next, FIG. 14 is a transverse sectional view for illustrating a main part of a rotor of a rotating electric machine according to a third embodiment of this invention. Further, FIG. 15 is a perspective view for illustrating the insulation 32 of FIG. 14.

A pair of relief grooves 32e are formed at boundary portions between the pair of extended portions 32b and the insulation main body 32a. Each relief groove 32e in the third embodiment enters the extended portion 32b. Further, a bottom surface of each relief groove 32e is located at the extended portion 32b. An inclined surface is formed between the bottom surface of each relief groove 32e and the surface of the insulation main body 32a which is in contact with the damper bar 14.

A surface of a portion of each relief groove 32e entering the extended portion 32b, which is opposed to the bottom surface of each relief groove 32e, is located on the radially outer side of the rotor core 11 with respect to the surface of the insulation main body 32a which is in contact with the damper bar 14.

The pair of relief grooves 32e are continuously formed over the entire length of the insulation 32 along the axial direction of the rotor core 11. Other configurations and a repairing method are similar or identical to those of the second embodiment.

In the insulation 32 as described above, cutting work for the insulation main body 32a can be more easily performed, and the thickness of the insulation main body 32a can be more easily adjusted.

Fourth Embodiment

Figure 16:
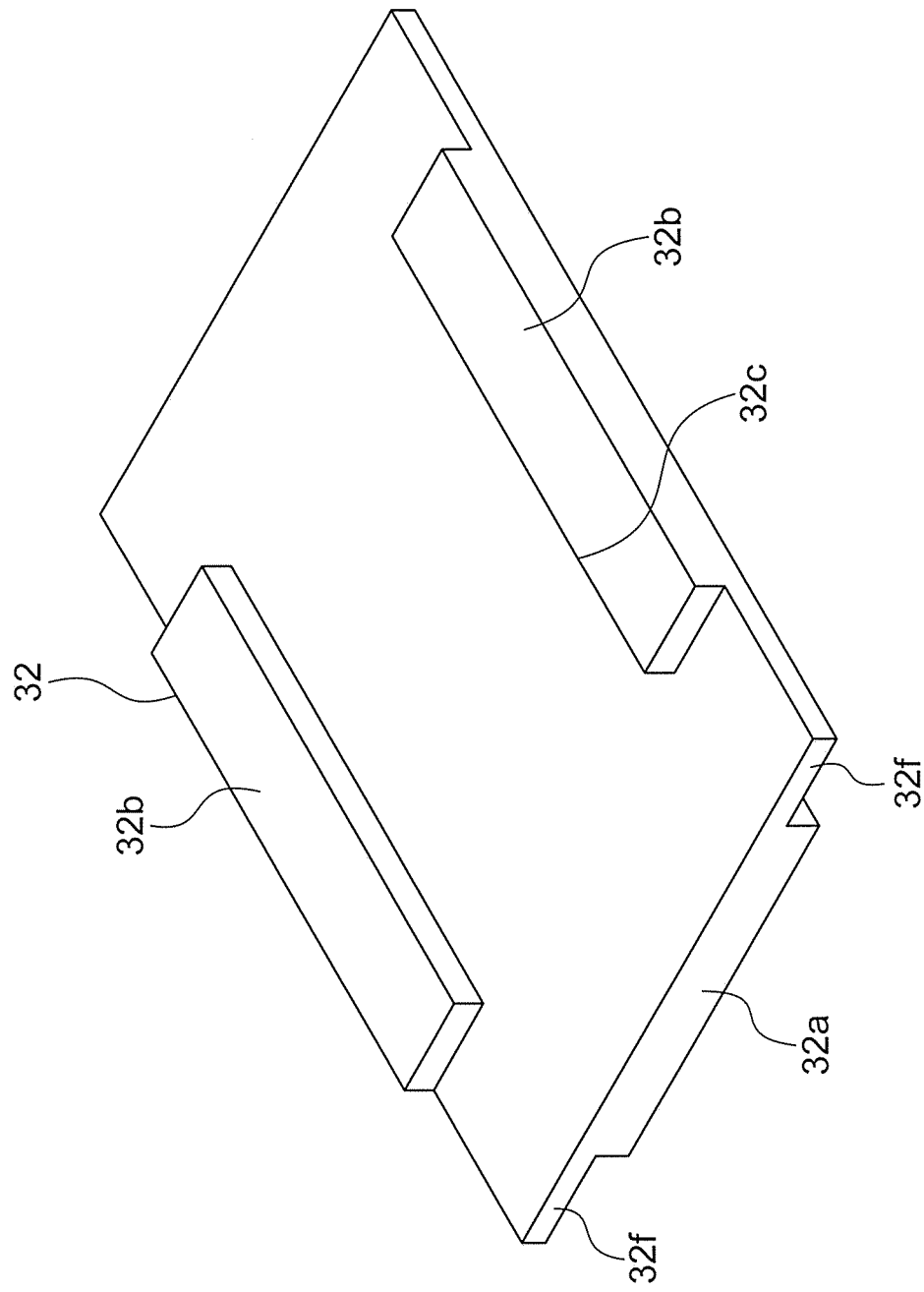
FIG. 16 is a perspective view for illustrating an insulation in a fourth embodiment of this invention.

Next, FIG. 16 is a perspective view for illustrating an insulation 32 in a fourth embodiment of this invention. In the first embodiment, the pair of extended portions 32b are formed over the entire insulation 32 along the axial direction of the rotor core 11. In contrast, in the fourth embodiment, the pair of extended portions 32b are formed only at a part of the insulation 32 in the axial direction of the rotor core 11.

Thus, portions in which the extended portion 32b is not formed are present at both end portions of the insulation 32 in the axial direction of the rotor core 11. Flange portions 32f each having a flat plate shape are formed at the portions in which the extended portion 32b is not formed. The flange portions 32f protrude from both end portions of the insulation main body 32a in the circumferential direction of the rotor core 11.

Each flange portion 32f is arranged between the step portion 11e and the first wedge member, the second wedge member, or the third wedge member 31. A surface of the flange portion 32f which is opposed to the first wedge member, the second wedge member, or the third wedge member 31 is flush with the surface of the insulation main body 32a which is in contact with the damper bar 14. Other configurations and a repairing method are similar or identical to those of the first embodiment.

In the insulation 32 as described above, when the thickness of the insulation main body 32a is to be adjusted, a tool can be released to the portion in which the extended portion 32b is not formed at the beginning and the end of processing. With this, the cutting work for the insulation main body 32a can be easily performed, and the thickness of the insulation main body 32a can be easily adjusted.

Fifth Embodiment

Figure 17:
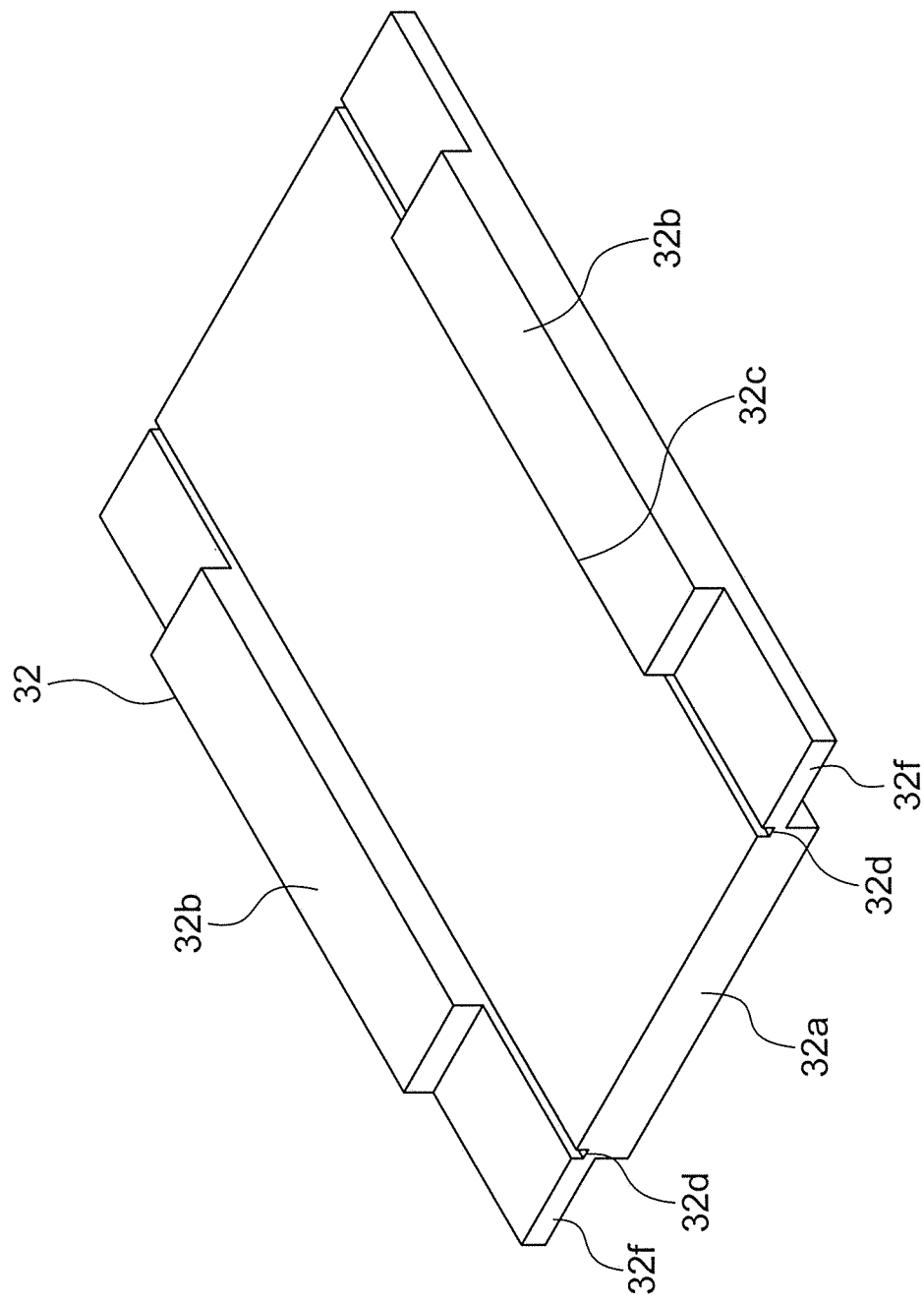
FIG. 17 is a perspective view for illustrating an insulation in a fifth embodiment of this invention.

Next, FIG. 17 is a perspective view for illustrating an insulation 32 in a fifth embodiment of this invention. The fifth embodiment is obtained by combining the fourth embodiment and the second embodiment to each other. That is, in the fifth embodiment, the relief grooves 32d illustrated in the second embodiment are formed in the insulation 32 illustrated in the fourth embodiment. Other configurations and a repairing method are similar or identical to those of the fourth embodiment.

In the insulation 32 as described above, cutting work for the insulation main body 32a can be more easily performed, and the thickness of the insulation main body 32a can be more easily adjusted.

Sixth Embodiment

Figure 18:
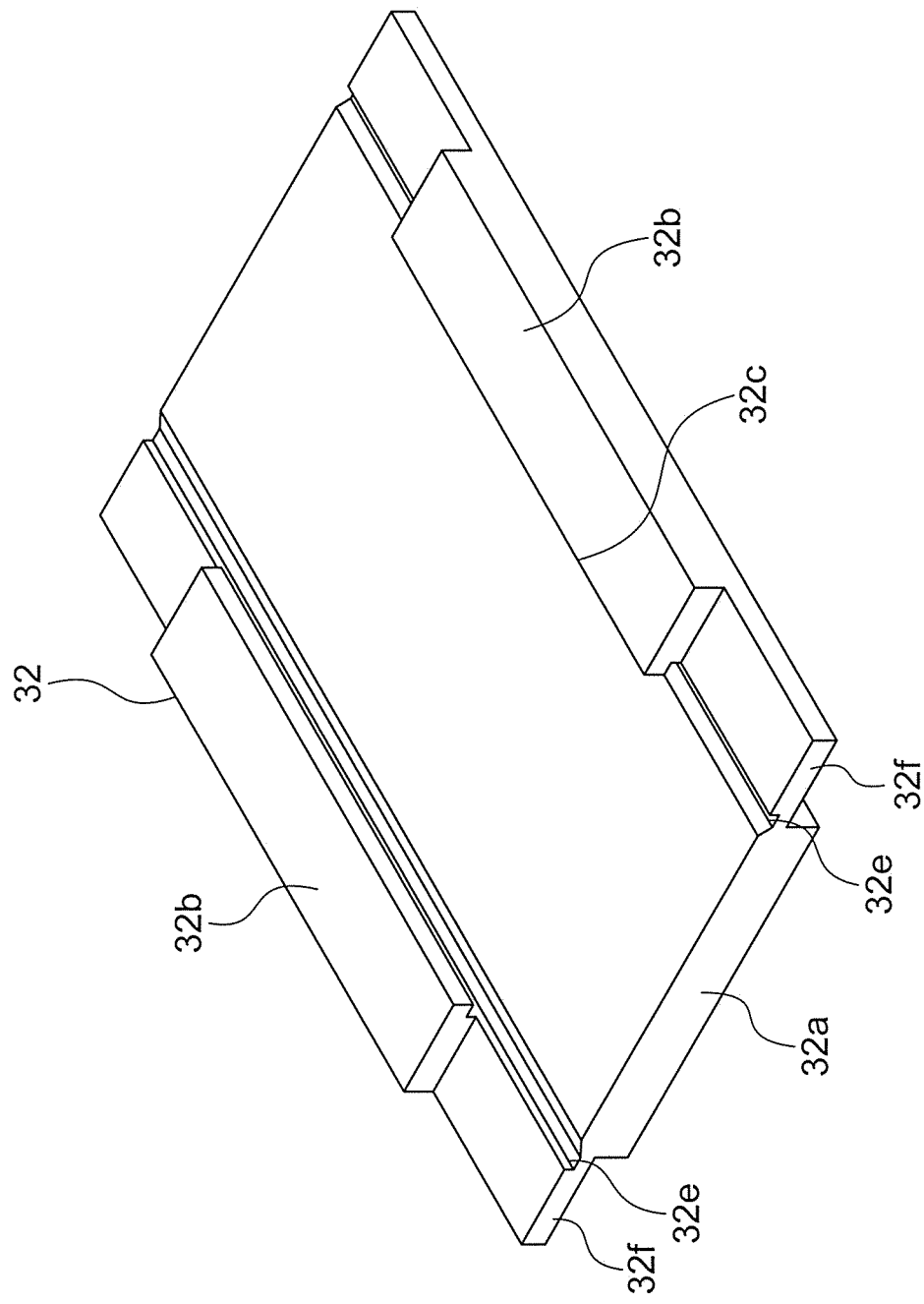
FIG. 18 is a perspective view for illustrating an insulation in a sixth embodiment of this invention.

Next, FIG. 18 is a perspective view for illustrating an insulation 32 in a sixth embodiment of this invention. The sixth embodiment is obtained by combining the fourth embodiment and the third embodiment to each other. That is, in the sixth embodiment, the relief grooves 32e illustrated in the third embodiment are formed in the insulation 32 illustrated in the fourth embodiment. Other configurations and a repairing method are similar or identical to those of the fourth embodiment.

In the insulation 32 as described above, cutting work for the insulation main body 32a can be more easily performed, and the thickness of the insulation main body 32a can be more easily adjusted.

Seventh Embodiment

Figure 19:
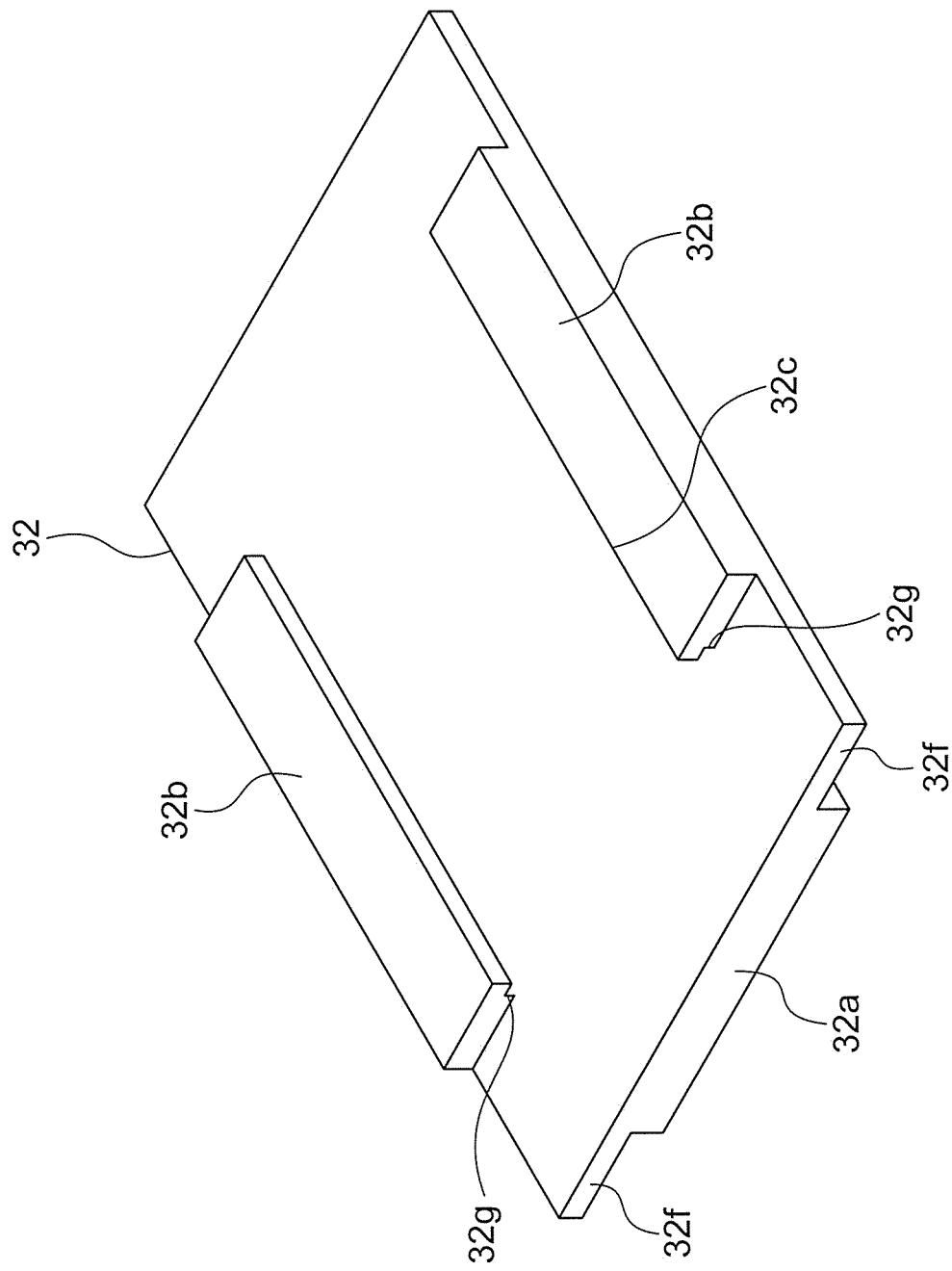
FIG. 19 is a perspective view for illustrating an insulation in a seventh embodiment of this invention.

Next, FIG. 19 is a perspective view for illustrating an insulation 32 in a seventh embodiment of this invention. Relief grooves 32g are formed in the pair of extended portions 32b, respectively. Each relief groove 32g is opened on the surface of the insulation main body 32a which is in contact with the damper bar 14.

Further, each relief groove 32g is continuously formed over the entire extended portion 32b in the axial direction of the rotor core 11. Other configurations and a repairing method are similar or identical to those of the fourth embodiment.

In the insulation 32 as described above, cutting work for the insulation main body 32a can be easily performed, and the thickness of the insulation main body 32a can be easily adjusted.

The relief grooves 32g can also be formed in the extended portions 32b in the first embodiment.

Eighth Embodiment

Figure 20:
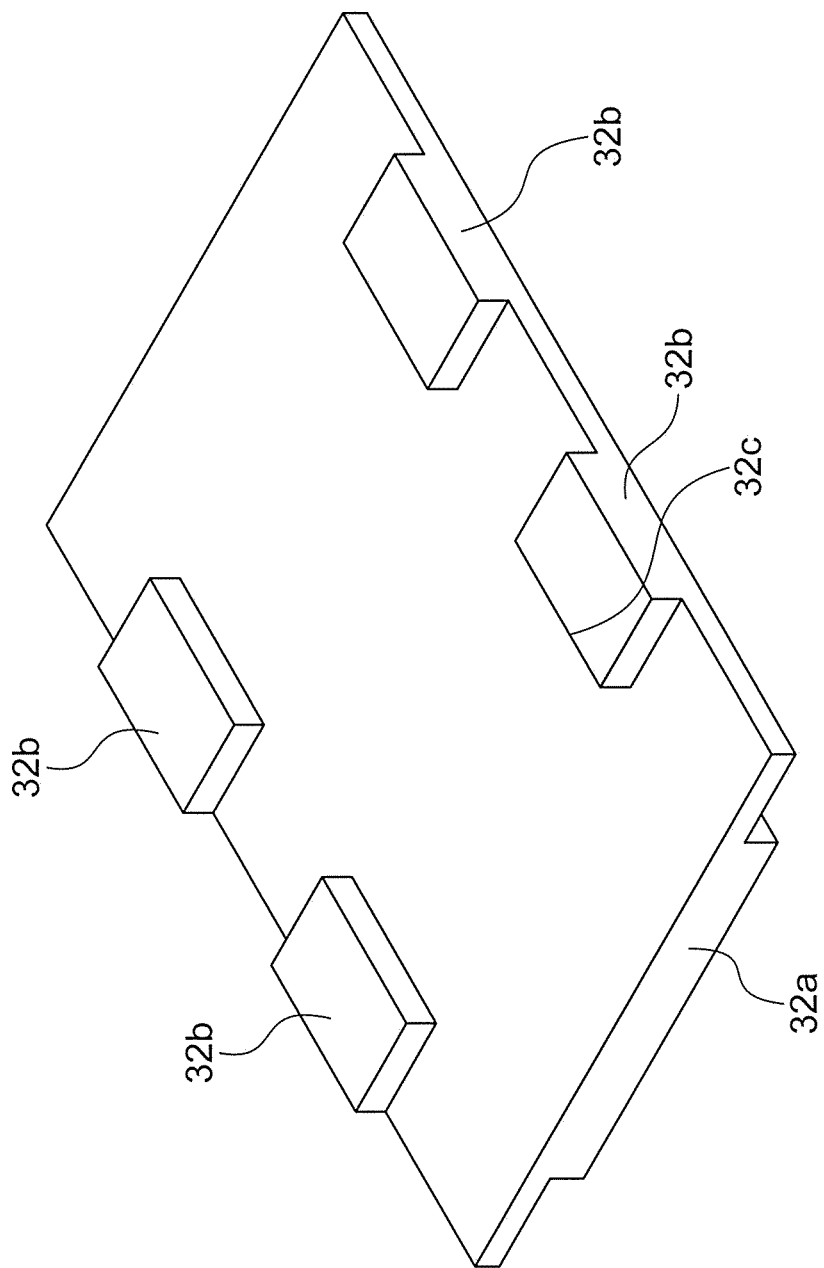
FIG. 20 is a perspective view for illustrating an insulation in an eighth embodiment of this invention.

Next, FIG. 20 is a perspective view for illustrating an insulation 32 in an eighth embodiment of this invention. In the eighth embodiment, the portion in which the extended portion 32b is not formed is present also in an intermediate portion of the insulation 32 in the axial direction of the rotor core 11. That is, the extended portions 32b are intermittently formed in the axial direction of the rotor core 11.

With this, on one side of the insulation 32 in the circumferential direction of the rotor core 11, two extended portions 32b are arranged apart from each other in the axial direction of the rotor core 11. Similarly, on the other side of the insulation 32 in the circumferential direction of the rotor core 11, two extended portions 32b are arranged apart from each other in the axial direction of the rotor core 11. Other configurations and a repairing method are similar or identical to those of the fourth embodiment.

Also in the insulation 32 as described above, the cutting work for the insulation main body 32a can be easily performed, and the thickness of the insulation main body 32a can be easily adjusted. Further, as compared to the fourth embodiment, the weight of the insulation 32 is reduced, thereby being capable of reducing the centrifugal force to be applied to the first wedge member, the second wedge member, or the third wedge member 31.

Similarly to the eighth embodiment, in the insulation 32 in each of the second to seventh embodiments, the extended portions 32b may be intermittently formed in the axial direction of the rotor core 11.

Ninth Embodiment

Figure 21:
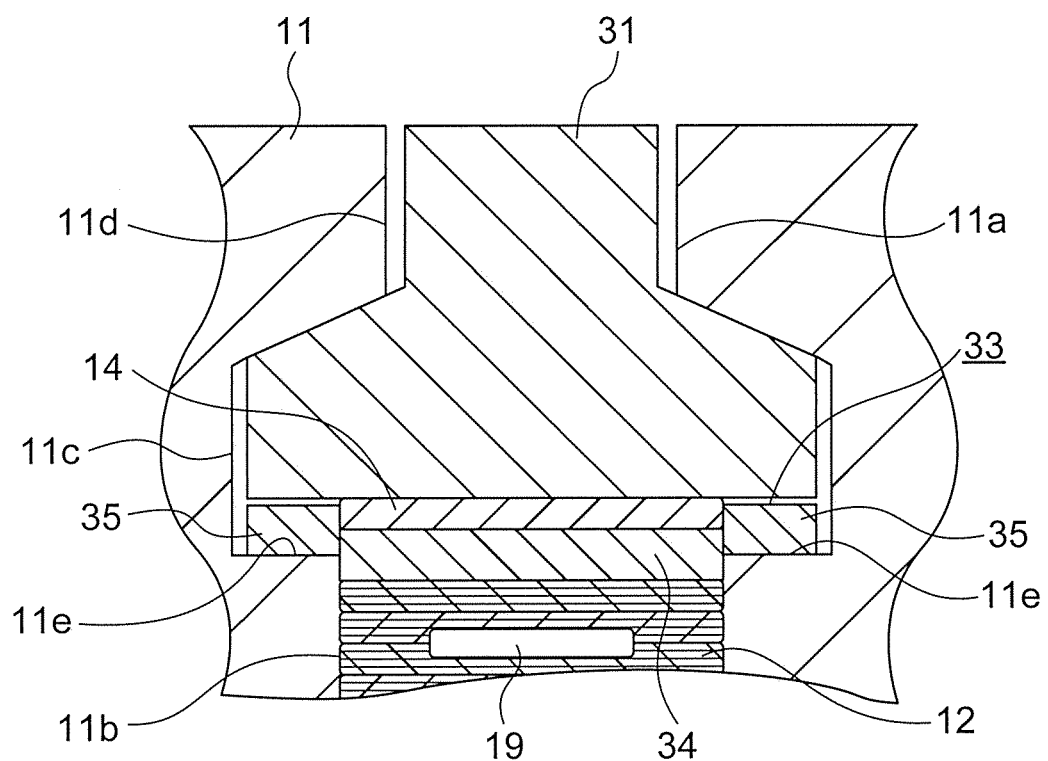
FIG. 21 is a transverse sectional view for illustrating a main part of a rotor of a rotating electric machine according to a ninth embodiment of this invention.
Figure 22:
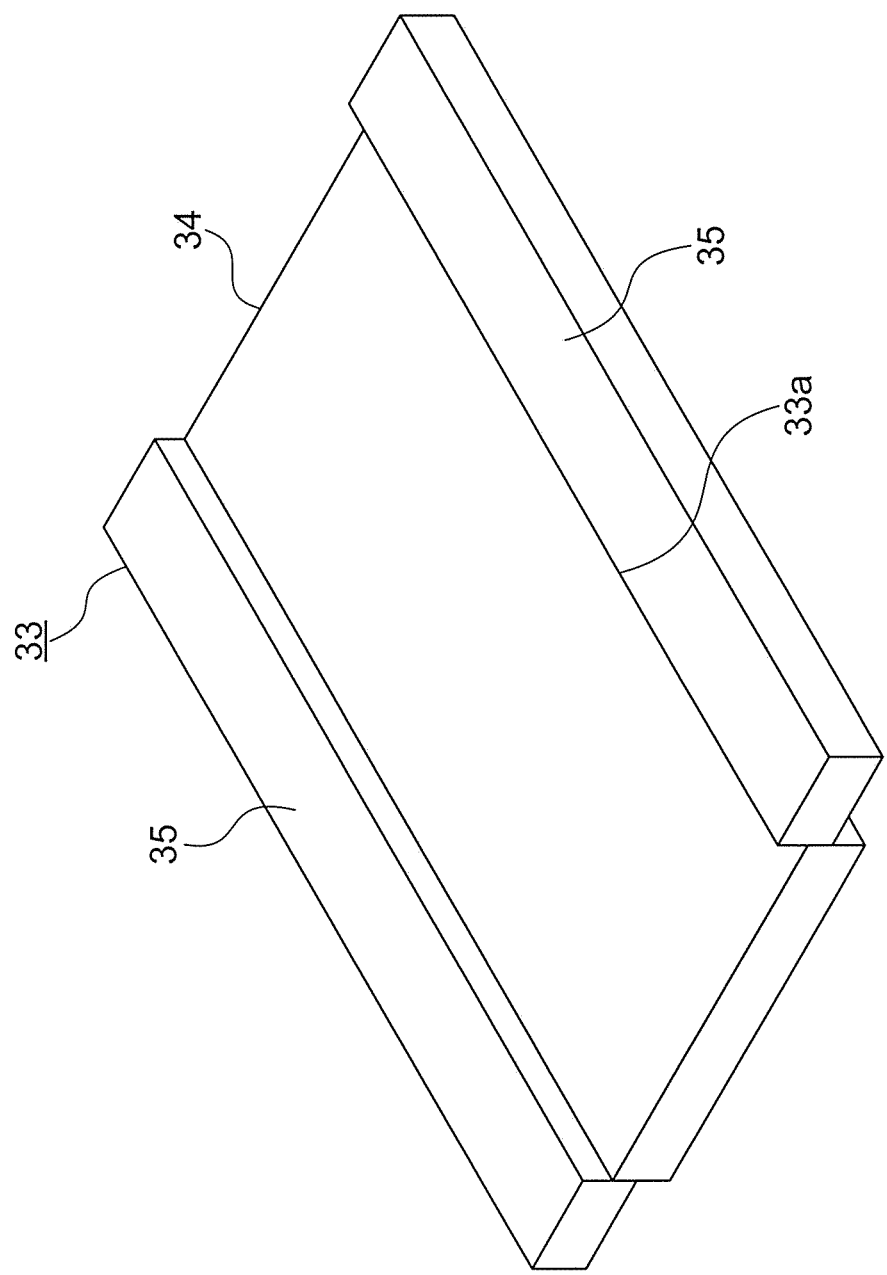
FIG. 22 is a perspective view for illustrating an insulation of FIG. 21.

Next, FIG. 21 is a transverse sectional view for illustrating a main part of a rotor of a rotating electric machine according to a ninth embodiment of this invention. Further, FIG. 22 is a perspective view for illustrating an insulation of FIG. 21. An insulation 33 in the ninth embodiment includes an insulation main body 34 and a pair of extended portions 35.

The insulation main body 34 and the pair of extended portions 35 are formed as separate components. That is, the insulation 33 in the ninth embodiment has a three-divided structure. Further, the insulation main body 34 and the pair of extended portions 35 are integrated with each other by, for example, bonding. A bar receiving groove 33a is formed between the pair of extended portions 35 along the axial direction of the rotor core 11. Other configurations and a repairing method are similar or identical to those of the first embodiment.

In the insulation 33 as described above, after the insulation main body 34 is subjected to cutting to adjust the thickness of the insulation main body 34, the insulation main body 34 and the pair of extended portions 35 can be integrated with each other. With this, cutting work for the insulation main body 34 can be easily performed, and the thickness of the insulation main body 34 can be easily adjusted.

The insulation main body 32a and the pair of extended portions 32b in each of the second to eighth embodiments may be formed as separate components and integrated with each other.

Tenth Embodiment

Figure 23:
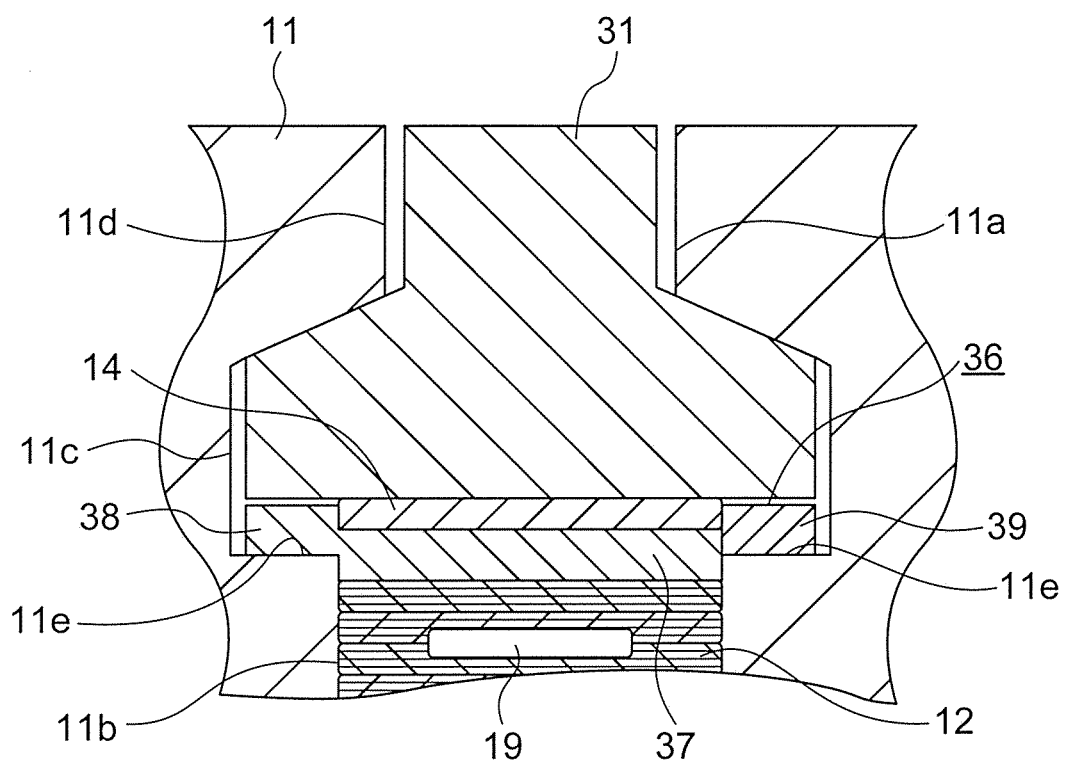
FIG. 23 is a transverse sectional view for illustrating a main part of a rotor of a rotating electric machine according to a tenth embodiment of this invention.
Figure 24:
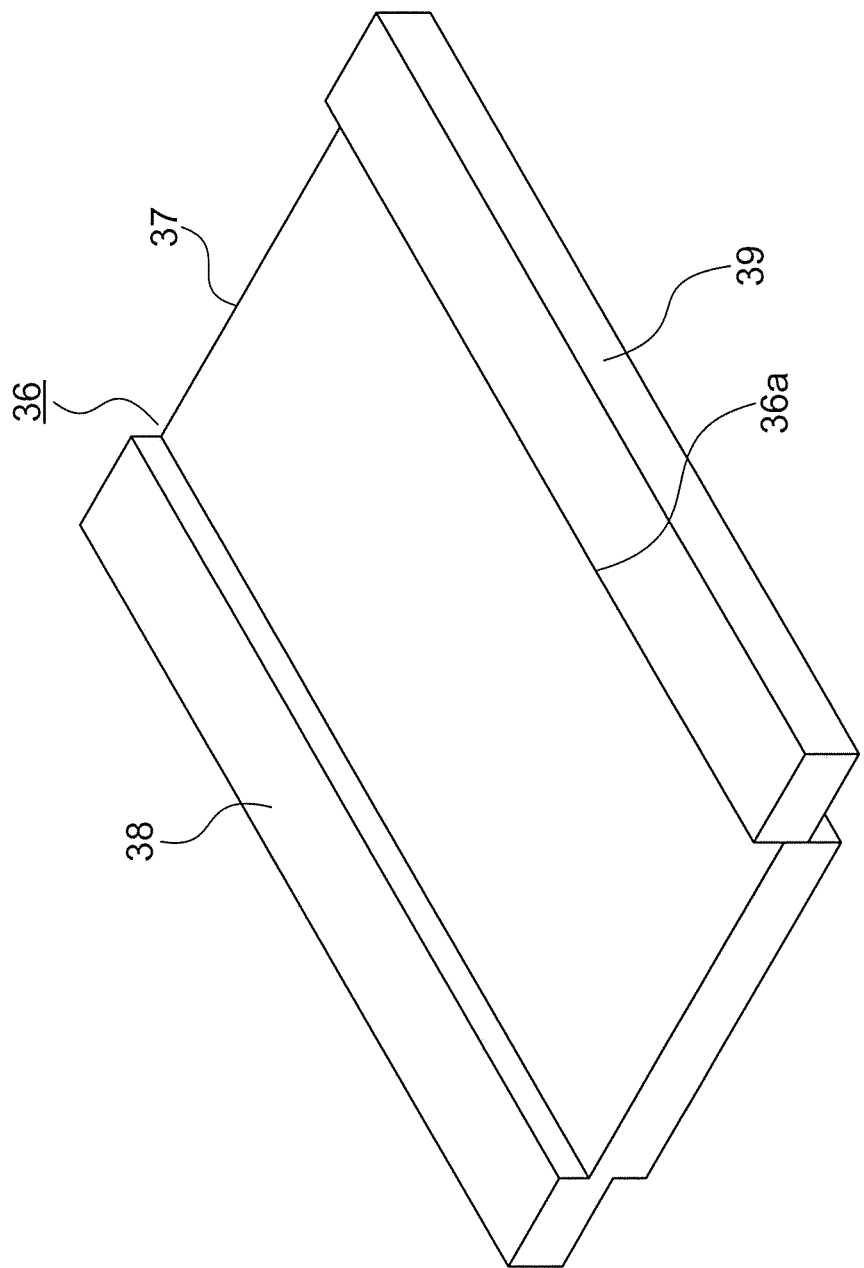
FIG. 24 is a perspective view for illustrating an insulation of FIG. 23.

Next, FIG. 23 is a transverse sectional view for illustrating a main part of a rotor of a rotating electric machine according to a tenth embodiment of this invention. Further, FIG. 24 is a perspective view for illustrating an insulation of FIG. 23. An insulation 36 in the tenth embodiment includes an insulation main body 37, a first extended portion 38, and a second extended portion 39.

The first extended portion 38 is arranged between one of the pair of step portions 11e and the first wedge member, the second wedge member, or the third wedge member 31. The second extended portion 39 is arranged between the other of the pair of step portions 11e and the first wedge member, the second wedge member, or the third wedge member 31.

The insulation main body 37 and the first extended portion 38 are formed as one component. The second extended portion 39 is formed as a separate component from the insulation main body 37. That is, the insulation 36 in the tenth embodiment has a two-divided structure. Further, the insulation main body 37 and the second extended portion 39 are integrated with each other by, for example, bonding. A bar receiving groove 36a is formed between the first extended portion 38 and the second extended portion 39 along the axial direction of the rotor core 11. Other configurations and a repairing method are similar or identical to those of the ninth embodiment.

In the insulation 36 as described above, after the insulation main body 37 is subjected to cutting to adjust the thickness of the insulation main body 37, the insulation main body 37 and the second extended portion 39 can be integrated with each other. With this, cutting work for the insulation main body 37 can be easily performed, and the thickness of the insulation main body 37 can be easily adjusted.

Further, the number of components is smaller than that in the ninth embodiment, thereby facilitating assembly work.

The insulation main body 32a and the pair of extended portions 32b in each of the second to eighth embodiments may be formed as separate components and integrated with each other.

Eleventh Embodiment

Figure 25:
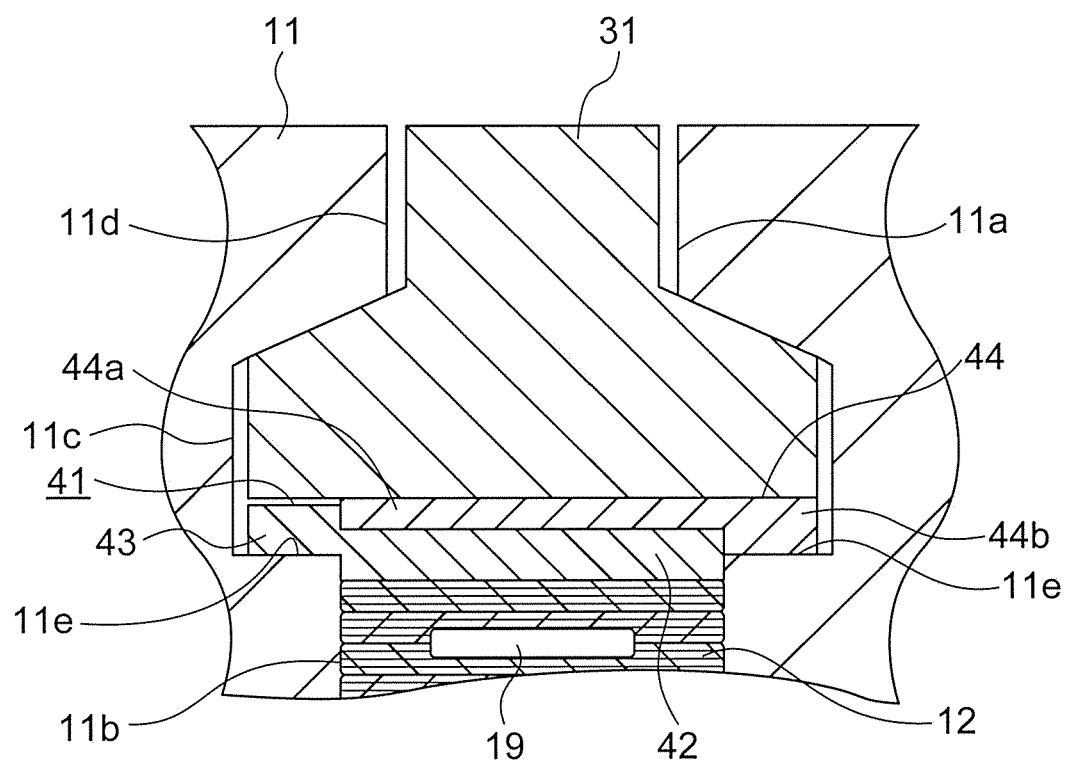
FIG. 25 is a transverse sectional view for illustrating a main part of a rotor of a rotating electric machine according to an eleventh embodiment of this invention.
Figure 26:
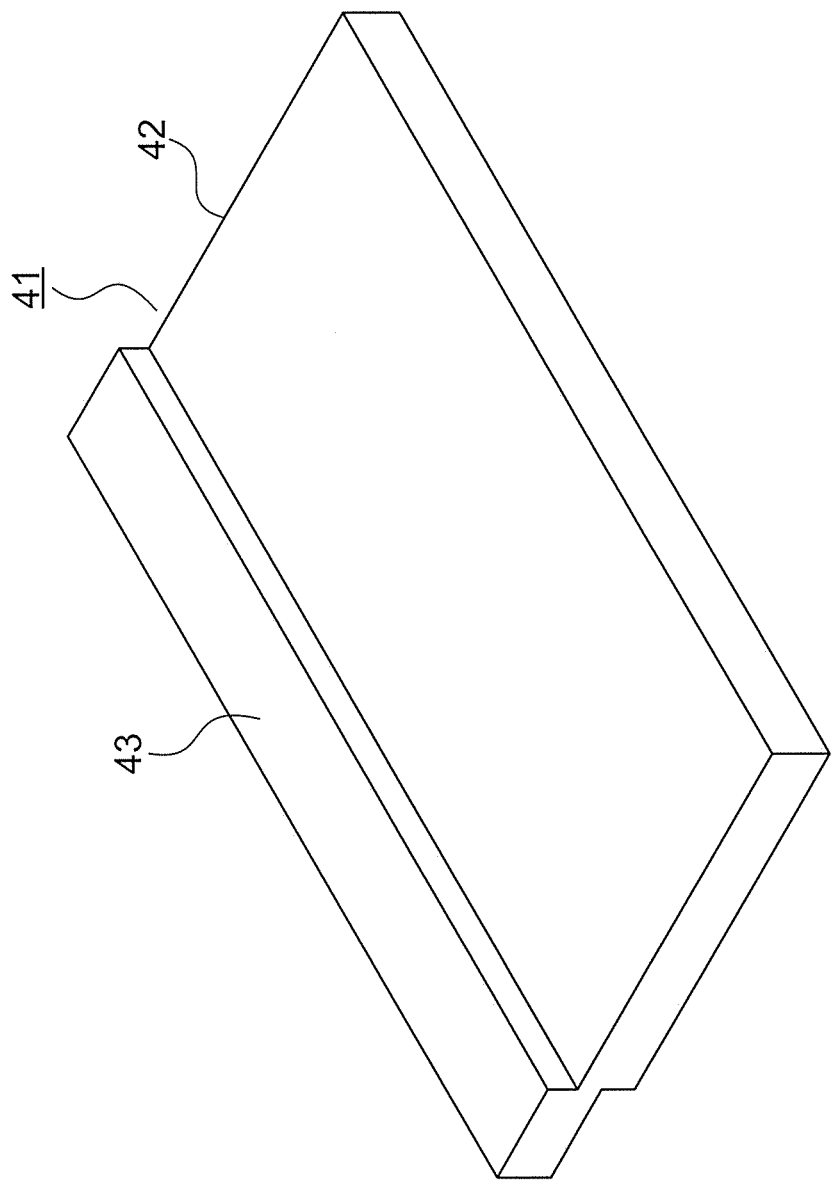
FIG. 26 is a perspective view for illustrating an insulation of FIG. 25.
Figure 27:
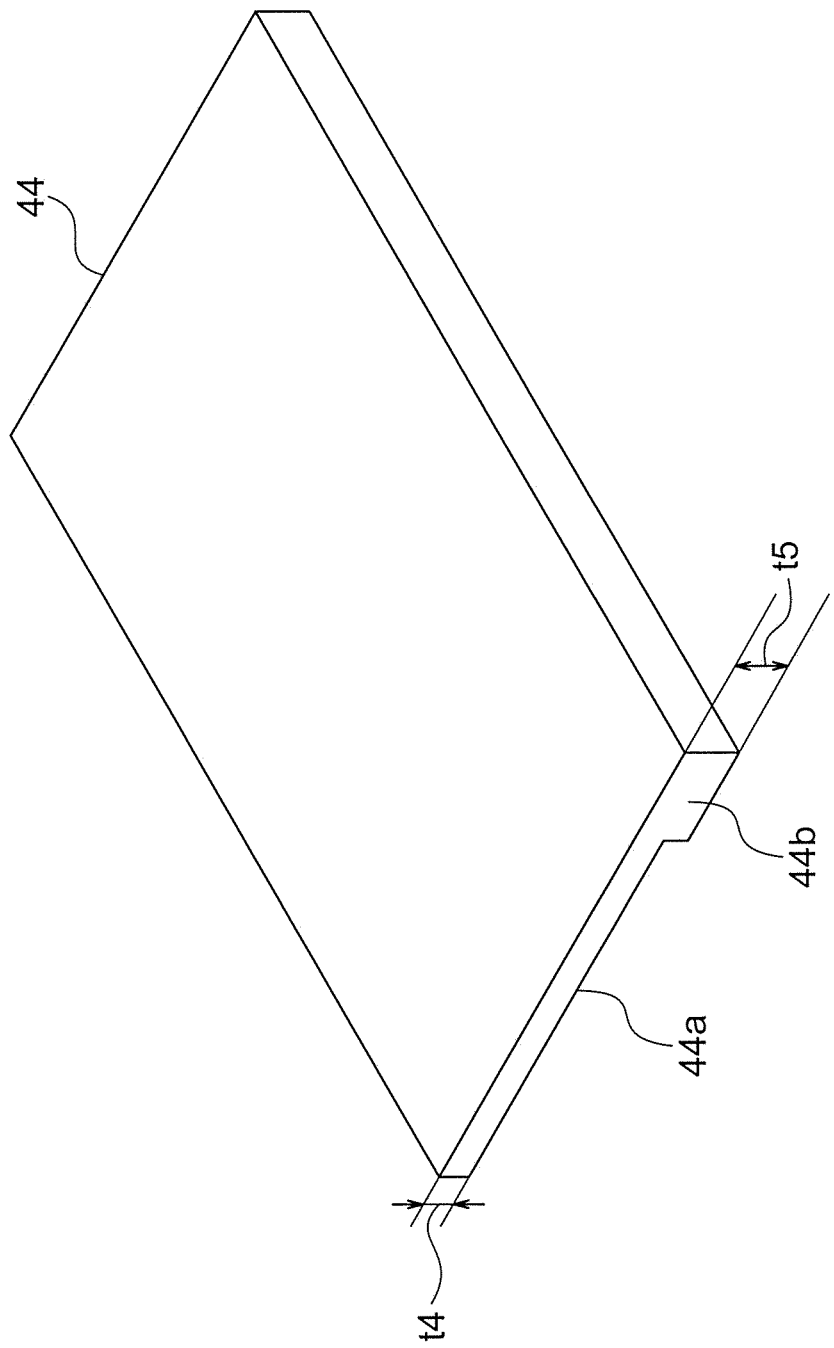
FIG. 27 is a perspective view for illustrating a damper bar of FIG. 25.

Next, FIG. 25 is a transverse sectional view for illustrating a main part of a rotor of a rotating electric machine according to an eleventh embodiment of this invention. Further, FIG. 26 is a perspective view for illustrating an insulation of FIG. 25. Further, FIG. 27 is a perspective view for illustrating a damper bar of FIG. 25.

An insulation 41 in the eleventh embodiment includes an insulation main body 42 and an extended portion 43. The extended portion 43 is arranged between one of the pair of step portions 11e and the first wedge member, the second wedge member, or the third wedge member 31. The extended portion 43 is formed only on one side of the insulation main body 42 in the circumferential direction of the rotor core 11. The insulation main body 42 and the extended portion 43 are formed as one component.

A damper bar 44 in the eleventh embodiment includes a damper bar main body 44a and a thick portion 44b. The damper bar main body 44a is arranged between the insulation main body 42 and the first wedge member, the second wedge member, or the third wedge member 31.

The thick portion 44b is arranged between the other of the pair of step portions 11e and the first wedge member, the second wedge member, or the third wedge member 31. A thickness dimension t5 of the thick portion 44b in the radial direction of the rotor core 11 is larger than a thickness dimension t4 of the damper bar main body 44a in the radial direction of the rotor core 11.

The sectional area of the entire damper bar 44 is equal to the sectional area of the damper bar 14 in the first embodiment. A thickness dimension of the damper bar main body 44a is smaller than a thickness dimension of the damper bar 14 in the first embodiment. Other configurations and a repairing method are similar or identical to those of the first embodiment.

In such a configuration, the extended portion 43 is formed only on one side of the insulation main body 42. Thus, the cutting work for the insulation main body 37 can be easily performed, and the thickness of the insulation main body 37 can be easily adjusted.

Further, in order to secure a certain sectional area in the damper bar 44, the thickness dimension of the damper bar main body 44a can be reduced by a dimension corresponding to the thick portion 44b. With this, the total sectional area of the field winding 12 can be further increased, and the loss can be further reduced.

The relief grooves as described in the second, third, or seventh embodiment may be formed in the insulation 41 in the eleventh embodiment.

Further, the portion in which the extended portion is not formed as described in the fourth or eighth embodiment may be present in the insulation 41 in the eleventh embodiment.

Further, the insulation main body 42 and the extended portion 43 in the eleventh embodiment may be formed as separate components and integrated with each other.

Twelfth Embodiment

Figure 28:
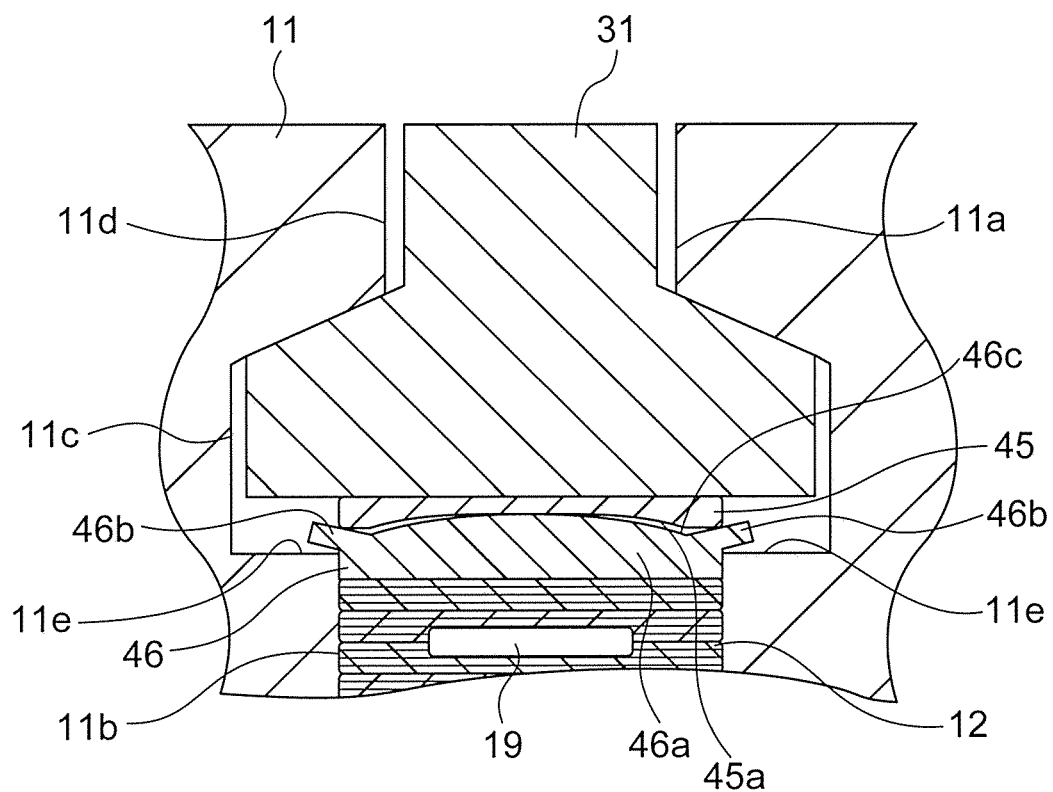
FIG. 28 is a transverse sectional view for illustrating a main part of a rotor of a rotating electric machine according to a twelfth embodiment of this invention.

Next, FIG. 28 is a transverse sectional view for illustrating a main part of a rotor of a rotating electric machine according to a twelfth embodiment of this invention. An insulation 46 in the twelfth embodiment includes an insulation main body 46a and a pair of extended portions 46b. On a surface of the insulation main body 46a on a side opposite to the field winding 12, a protruding portion 46c having an arc-shaped cross section is formed.

The pair of extended portions 46b protrude obliquely in a direction of approaching the first wedge member, the second wedge member, or the third wedge member 31 from both end portions of the insulation main body 46a in the circumferential direction of the rotor core 11. Further, the pair of extended portions 46b are in contact with both end portions of a damper bar 45 in the circumferential direction of the rotor core 11.

In the damper bar 45, a recessed portion 45a having an arc-shaped cross section is formed. In an initial stage of assembly, the pair of extended portions 46b are in contact with the damper bar 45. After that, when a centrifugal force during operation is applied to the insulation 46, the protruding portion 46c comes into contact with the recessed portion 45a.

A dimension of the damper bar 45 in the circumferential direction of the rotor core 11 is larger than a dimension of the insulation main body 46a in the same direction. Other configurations and a repairing method are similar or identical to those of the first embodiment.

In such a configuration, the pair of extended portions 46b protrude obliquely from the insulation main body 46a. Thus, the dimension of the damper bar 45 in the circumferential direction of the rotor core 11 can be made larger than the dimension of the insulation main body 46a in the same direction.

With this, in order to secure a certain sectional area in the damper bar 45, a thickness dimension of the damper bar 45 can be reduced. With this, the total sectional area of the field winding 12 can be further increased, and the loss can be further reduced.

In the twelfth embodiment, a protruding portion may be formed on the damper bar, and a recessed portion may be formed in the insulation main body.

Further, the insulation as described in each of the first to twelfth embodiments is not necessarily required to be arranged below all the thin wedge members. For example, the insulation as described in each of the first to twelfth embodiments and the insulation 13 as described in FIG. 8 may be used in a mixed manner.

Further, in the above-mentioned first to twelfth embodiments, description has been made of the generator. However, this invention is not limited to the generator, and can be applied to a rotating electric machine such as an electric motor or a generator motor.

REFERENCE SIGNS LIST 3 rotor, 11 rotor core, 11a slot, 11b winding insertion portion, 11c widened portion, 11e step portion, 12 field winding (rotor winding), 13 existing insulation, 14, 44, 45 damper bar, 15 existing first wedge member, 16 existing second wedge member, 17 existing third wedge member, 30 space, 31 thin third wedge member, 32, 33, 36, 41, 46 insulation, 32a, 34, 37, 42, 46a insulation main body, 32b, 35, 43, 46b extended portion, 32d, 32e, 32g relief groove, 38 first extended portion, 39 second extended portion, 44a damper bar main body, 44b thick portion, 45a recessed portion, 46c protruding portion.

The invention claimed is:

1. A rotor of a rotating electric machine, comprising:
 a rotor core including a slot formed therein;
 a rotor winding inserted into the slot;
 a damper bar, which has conductivity, and is inserted into the slot on a radially outer side of the rotor core with respect to the rotor winding;
 an insulation, which is arranged between the rotor winding and the damper bar, and is configured to electrically insulate the rotor winding and the damper bar from each other; and
 a wedge member, which is inserted into the slot on the radially outer side of the rotor core with respect to the damper bar, and is configured to hold the rotor winding, the insulation, and the damper bar inside the slot,
 wherein, when a cross section orthogonal to an axis of the rotor core is viewed, the slot includes:
  a winding insertion portion into which the rotor winding is inserted; and
  a widened portion in which an end portion of the wedge member on the damper bar side is arranged,
 wherein a width dimension of the widened portion is larger than a width dimension of the winding insertion portion,
 wherein a pair of step portions are formed on both sides of an end portion of the winding insertion portion on the widened portion side,
 wherein the wedge member is spaced from and opposed to the pair of step portions,
 wherein the insulation includes:
  an insulation main body arranged between the rotor winding and the damper bar; and
  an extended portion, which is arranged in at least a part of a space between the wedge member and the pair of step portions, and is configured to suppress movement of the damper bar in a circumferential direction of the rotor core,
 wherein, when a distance between the step portions and the wedge member is L1, and a thickness dimension of the extended portion in a radial direction of the rotor core is t1, a relationship of L1>t1 is satisfied,
 wherein, when a thickness dimension of the damper bar in the radial direction of the rotor core is t4, and a thickness dimension of a portion of the extended portion which is located on the radially outer side of the rotor core with respect to the insulation main body is t2, a relationship of t4>t2 is satisfied, and
 wherein a relationship of (L1−t1)<t4 is satisfied.

2. The rotor of a rotating electric machine according to claim 1,
 wherein, when a distance from a boundary between the winding insertion portion and the widened portion to the rotor winding is L2, and a thickness dimension of a portion of the insulation main body which is located on a radially inner side of the rotor core with respect to the extended portion is t3, a relationship of L2<t3 is satisfied.

3. The rotor of a rotating electric machine according to claim 1, wherein a relief groove is formed at a boundary portion between a surface of the insulation main body which is opposed to the wedge member and the extended portion along an axial direction of the rotor core.

4. The rotor of a rotating electric machine according to claim 3,
 wherein the relief groove enters the extended portion,
 wherein an inclined surface is formed between a bottom surface of the relief groove and a surface of the insulation main body which is in contact with the damper bar, and
 wherein a surface of a portion of the relief groove entering the extended portion, which is opposed to the bottom surface of the relief groove, is located on the radially outer side of the rotor core with respect to the surface of the insulation main body which is in contact with the damper bar.

5. The rotor of a rotating electric machine according to claim 1, wherein the extended portion has a relief groove opened on a surface of the insulation main body which is in contact with the damper bar.

6. The rotor of a rotating electric machine according to claim 1, wherein the extended portion is formed only at a part of the insulation in the axial direction of the rotor core.

7. The rotor of a rotating electric machine according to claim 1, wherein the extended portion is formed intermittently in the axial direction of the rotor core.

8. The rotor of a rotating electric machine according to claim 1, wherein the insulation main body and the extended portion are formed as separate components and integrated with each other.

9. The rotor of a rotating electric machine according to claim 1,
 wherein the extended portion includes:
  a first extended portion arranged between one of the pair of step portions and the wedge member; and
  a second extended portion arranged between the other of the pair of step portions and the wedge member,
 wherein the insulation main body and the first extended portion are formed as one component, and
 wherein the second extended portion is formed as a separate component from the insulation main body, and is integrated with the insulation main body.

10. The rotor of a rotating electric machine according to claim 1,
 wherein the extended portion is arranged between one of the pair of step portions and the wedge member,
 wherein the damper bar includes:
  a damper bar main body arranged between the insulation main body and the wedge member; and
  a thick portion arranged between the other of the pair of step portions and the wedge member, and
 wherein a thickness dimension of the thick portion in the radial direction of the rotor core is larger than a thickness dimension of the damper bar main body in the radial direction of the rotor core.

11. The rotor of a rotating electric machine according to claim 1,
- wherein the extended portion includes a pair of extended portions which protrude obliquely from the insulation main body in a direction of approaching the wedge member, and are in contact with both end portions of the damper bar in the circumferential direction of the rotor core,
- wherein any one of the insulation main body and the damper bar has a protruding portion having an arc-shaped cross section, and
- wherein the other of the insulation main body and the damper bar has a recessed portion having an arc-shaped cross section, and the protruding portion is to be in contact with the recessed portion.

12. A repairing method for a rotor of a rotating electric machine,
- the rotor including:
  - a rotor core including a slot formed therein;
  - a rotor winding inserted into the slot;
  - a damper bar, which has conductivity, and is inserted into the slot on a radially outer side of the rotor core with respect to the rotor winding;
  - an existing insulation, which is arranged between the rotor winding and the damper bar, and is configured to electrically insulate the rotor winding and the damper bar from each other; and
  - an existing wedge member, which is inserted into the slot on the radially outer side of the rotor core with respect to the damper bar, and is configured to hold the rotor winding, the existing insulation, and the damper bar inside the slot,
- the repairing method comprising a step of replacing the existing wedge member with a thin wedge member and replacing the existing insulation with a new insulation to increase a total sectional area of the rotor winding in the slot,
- wherein the new insulation includes:
  - an insulation main body arranged between the rotor winding and the damper bar; and
  - an extended portion, which is arranged in a space defined inside the slot as a result of replacement of the existing wedge member with the thin wedge member, and is configured to suppress movement of the damper bar in a circumferential direction of the rotor core.

\* \* \* \* \*